United States Patent
Yajima et al.

[11] Patent Number: 5,729,731
[45] Date of Patent: Mar. 17, 1998

[54] METHOD OF RETRIEVING IN A DATABASE THROUGH IMAGE INFORMATION

[75] Inventors: Hiroshi Yajima, Suita; Hiroyuki Okuda, Ikeda; Noritsugu Kagaya, Hiroshima; Maki Tamano, Minoo; Shunsuke Akifuji, Wako, all of Japan

[73] Assignee: Hitachi, Ltd., Tokyo, Japan

[21] Appl. No.: 406,222

[22] Filed: Mar. 16, 1995

[30] Foreign Application Priority Data

Mar. 18, 1994 [JP] Japan .................................. 6-048331
Mar. 18, 1994 [JP] Japan .................................. 6-048336

[51] Int. Cl.$^6$ ........................................................ G06F 17/30
[52] U.S. Cl. ........................... 395/603; 395/604; 395/615; 340/990
[58] Field of Search ............................... 395/600, 603, 395/604, 615; 340/990

[56] References Cited

U.S. PATENT DOCUMENTS

| | | | |
|---|---|---|---|
| 4,553,206 | 11/1985 | Smutek et al. | 364/300 |
| 4,675,676 | 6/1987 | Takanabe et al. | 340/995 |
| 4,969,114 | 11/1990 | Herring et al. | 364/570 |
| 5,032,989 | 7/1991 | Tornetta | 364/401 |
| 5,241,671 | 8/1993 | Reed et al. | 395/600 |
| 5,278,946 | 1/1994 | Shimada et al. | 395/62 |
| 5,329,108 | 7/1994 | Lamoure | 235/494 |
| 5,329,464 | 7/1994 | Simic et al. | 364/512 |
| 5,414,462 | 5/1995 | Veatch | 348/135 |
| 5,543,788 | 8/1996 | Mikuni | 340/990 |

FOREIGN PATENT DOCUMENTS

| | | |
|---|---|---|
| 4-155474 | 5/1992 | Japan . |
| 5-165401 | 7/1993 | Japan . |

OTHER PUBLICATIONS

CHI '94 Conference Proceedings, Apr. 1994, "The Movable Filter as a User Interface Tool", Stone et al, pp. 306–309.

Primary Examiner—Thomas G. Black
Assistant Examiner—Donald Min
Attorney, Agent, or Firm—Fay,Sharpe,Beall,Fagan,Minnich & McKee

[57] ABSTRACT

In a DB retrieval method, a two-step retrieval including quantitative and qualitative retrievals is interactively performed so that, through the operation of image information (e.g. map information) having a correspondence to a DB having text information such as attribute information stored therein, attribute information corresponding to the map information is retrieved from the DB. The quantitative retrieval includes a DB information reading process for reading image information, attribute information and information relevant thereto, and a quantitative retrieval process for making a quantitative retrieval including the partial overlaying of another information for retrieval on the original image information (or map information) or a rough retrieval with the other information used as a retrieval key called information lens, and storing the result of retrieval into a work file. The qualitative retrieval includes a DB information reading process for reading image information, attribute information and information relevant thereto, which are stored in the work file, and a qualitative retrieval process for making a qualitative retrieval in which the original image information (or map information) is overlaid with a retrieval key called a function sheet including the composition of a qualitative retrieval condition and an image indicative of a range of application of the retrieval condition, and displaying the result.

12 Claims, 33 Drawing Sheets

FIG.3A

| DB NUMBER 101 | | | | | | |
|---|---|---|---|---|---|---|
| | RECORD NUMBER 102 | ATTRIBUTE NUMBER 103 | FULL NAME 104 | SEX 105 | ADDRESS 106 | DATE OF BIRTH 107 |
| | | | | | | |
| | | | | | | |
| | | | | | | |
| | | | | | | |
| | | | | | | |
| | | | | | | |
| | | | | | | |

| DB NUMBER 111 | | | | | | |
|---|---|---|---|---|---|---|
| | RECORD NUMBER 112 | ATTRIBUTE NUMBER 113 | NAME OF HOUSEHOLDER 114 | ADDRESS 115 | SITE AREA 116 | NAME OF LANDOWNER 117 |
| | | | | | | |
| | | | | | | |
| | | | | | | |
| | | | | | | |
| | | | | | | |
| | | | | | | |
| | | | | | | |

| CONSECUTIVE NUMBER | COORDINATES OF CORRESPONDENT POINT ON FIRST IMAGE INFORMATION | COORDINATES OF CORRESPONDENT POINT ON SECOND IMAGE INFORMATION |
|---|---|---|
|  |  |  |
|  |  |  |
|  |  |  |
|  |  |  |

METHOD OF RETRIEVING IN A DATABASE THROUGH IMAGE INFORMATION

BACKGROUND OF THE INVENTION

The present invention relates to a method for retrieving information with image information and text information being linked to each other, and more particularly to a method for retrieving information with a plurality of image information being overlaid with each other in a limited area.

The plan concerning an area has conventionally been made in such a manner that the feature or the like of that area are investigated by using a map and detailed information is acquired by retrieving a relational information database (hereinafter abbreviated to DB) concerning that area. Usually, a describing language or SQL (Structured Query Language) for retrieval is used for the retrieval of DB.

For example, a retrieval system using text information has been disclosed in JP-A-5-165401 entitled "MAP RETRIEVAL SYSTEM". In the disclosed system, a map database is retrieved with a telephone number used as a key for getting the result of retrieval so that the corresponding map is displayed and a marking is made at a position on the map corresponding to the telephone number. In displaying the map, an address and a subscriber's name associated with the telephone number acquired by retrieving the database are displayed.

Also, JP-A-4-155474 entitled "IMAGE PROCESSING METHOD AND SYSTEM" has discloses a preferred image processing method in which attribute information of an area to be retrieved on an arrangement diagram such as a map or layout is outputted with a correspondence to an area on the arrangement diagram. The disclosed method includes inputting an arrangement diagram, inputting a figure to define the boundary of a predetermined area in the arrangement diagram by use of an image input device, overlaying the inputted arrangement diagram with the boundary defining figure, and storing the overlaid composition of the diagram and the figure into a memory, thereby facilitating the processing of information concerning the predetermined area in the arrangement diagram.

A city planning operation is an example of a planning operation that uses maps. In the city planning operation, development planning is investigated and made on a desk on the basis of various materials or data. The materials include maps such as the city planning map, residential map and cadastral map, and information which is stored in a database (DB) and concerns residents and fixed properties.

In many cases, the city planning operation includes the followings tasks.

(1) A person acquires personal information concerning residents having their homes in a designated area or landowners possessing their lands in the area, administrative information concerning regulations defined in that area, and information shown in various maps and makes mutual reference to the information.

(2) He processes a work similar to the above work (1) while partially changing the area. In this case, he may change conditions for acquiring the other information while referring to the acquired information. Thus, the investigation of the planning about a plurality of areas requires roughly getting the information of the areas and investigating each area while making the comparison with the rough information obtained for the areas.

(3) A work similar to the above work (1) is repeated by not only changing an area to be investigated but also selecting information corresponding to the investigation.

Namely, the planning operation is made in many cases in such a manner that the operation and investigation are made while simultaneously viewing a plurality of maps for the same area. For example, in the case where a plan of a new road is to be made, it is necessary for him to know information concerning residents in areas along the new road by use of a residential map for the purpose of title negotiation and by using a map indicative of the ownership of lands to know information concerning the landowners and regulations determined for the respective areas.

However, it is difficult for him to plan while simultaneously referring to the plurality of maps and confirming detailed resident information and land information in the DB. The reason is that in the conventional system, the map and the DB are realized without a relation to each other and he must make the DB retrieval of relevant information while departing from the map.

In many cases, it is conventional that information necessary for a planning operation has its value in a locational relation (such as arrangement) displayed on a plan or diagram such as a map. In the conventional system, information retrieved from a DB is used in a form written down in the map. Therefore, the reference to the locational relation requires extra labor and a retrieval range is limited in many cases.

In the conventional system, since a system for displaying maps and a system for retrieving DB's are realized as separate systems, it is required that the retrieval of the DB having information stored therein and relevant to the maps should be made separately from the work of using the maps. For such circumstances, in the retrieval system using text information disclosed by JP-A-5-165401 entitled "MAP RETRIEVAL SYSTEM", the retrieval of DB information relevant to a map is made by retrieving a map database with text information of a telephone number used as a key for getting the result of retrieval so that not only a relevant map but also text information associated with the telephone number are displayed. However, this prior art has no disclosure of a solution for globally understanding a map and selecting objects from the map.

On the other hand, in the method disclosed by JP-A-4-155474 entitled "IMAGE PROCESSING METHOD AND SYSTEM", the processing of information concerning a predetermined area in an arrangement diagram is facilitated by performing an image processing in which the arrangement diagram is overlaid, by use of a marker, with a figure to define the boundary of the predetermined area in the arrangement diagram. However, this prior art has no disclosure as to a method of designating the predetermined area while making the trial of retrieval. Also, in the case where an SQL is used for retrieval, not only the retrieval requires considerable labor but also it is impossible for him to make the direct observation of the change of information on a map in the process of retrieval in a trial-and-error manner.

SUMMARY OF THE INVENTION

An object of the present invention is to provide a DB (database) retrieval method in which when a DB having text information stored therein and linked with image information such such a map is retrieved on the basis of the image information, a proper object of retrieval can be selected from massive information of the DB on the basis of a relation of the image information to another image information and a DB retrieval condition and a range of application thereof can easily be set imagewise on the image information.

Another object of the present invention is to provide a retrieval method which is capable of easily understanding the correspondence of plural kinds of maps concerning the same area to detailed information concerning each map.

A further object of the present invention is to provide a method which is capable of easily retrieving a DB relevant to a map by composing at least one retrieval condition on the map as an image.

To that end, a two-step retrieval including a qualitative retrieval and a quantitative retrieval, which will be mentioned, is performed through an interactive process. Though the operation of image information (for example, map information) having the correspondence to a DB having text information such as attribute information stored therein, text information corresponding to the image information is retrieved from the DB. In the following, the attribute information is used as the text information.

1) The qualitative retrieval includes a DB information reading process for reading image information, attribute information and information relevant thereto, and a qualitative retrieval process for making a qualitative retrieval including the partial overlaying of the first image information (for example, map information) with another image information related with the first image information for retrieval or a rough retrieval with another information used as a retrieval key to get the result of retrieval and for storing the result of retrieval into a work file. The retrieval key used in the qualitative retrieval process is called information lens. The qualitative retrieval process selects information from the information read through the DB information reading process. The result of selection is stored in the work file. The result of selection is a partial assembly of the information read through the DB information reading process.

2) The quantitative retrieval includes a DB information reading process for reading image information, attribute information and information relevant thereto, which are stored in the work file, and a quantitative retrieval process for making a quantitative retrieval in which the first image information is overlaid with a retrieval key called a function sheet including the composition of a quantitative retrieval condition and an image indicative of a area of application of the retrieval condition and for displaying the result of retrieval on a display device.

In the case where the obtained result of retrieval is not preferable or in the case where another retrieval is made, either a processing including the repetition of the qualitative retrieval and the quantitative retrieval subsequent thereto or a processing including the repetition of only the quantitative retrieval can be selected on the basis of a user's instruction.

The following processing is performed in the qualitative retrieval.

(1) In a DB information reading process, image information and text information stored in a DB are read and displayed on a display device.

(2) In a parameter setting process, a retrieval condition for the displayed image information is set.

(3) In an image information composing (or generating) process, another image information necessary for retrieval is displayed in a composite form with the above-mentioned image information on the basis of an inputted instruction.

(4) In a DB retrieval process, text information is retrieved from the DB on the basis of the retrieval conditions designated in the above items (2) and (3).

In the present invention, the generation or composition of image information in the above item (3) includes the composition of image information as will be mentioned in the following.

1) The other image information including detailed information is composed in a local area on the displayed image information.

2) A magnified version of another image information including detailed information is composed in a local area on the displayed image information.

3) Another image information including detailed information is composed in a local area on the displayed image information and within an area which includes a position set by the user.

4) By use of the correspondence of the displayed image information to another image information to be composed thereon, a modified version of another image information including detailed information is composed and displayed in a local area on the displayed image information.

The following processing is performed in the quantitative retrieval.

There is generated as image data a function sheet for composing the designation of an area to be retrieved and a DB retrieval condition. A frame designating the area to be retrieved is generated as the image data of the function sheet and is displayed overlaying image data to be subjected to retrieval (or which is an object of retrieval). An area corresponding to the image data of the function sheet is obtained or determined in accordance with a user's operation for the image data of the function sheet. A retrieval condition with the determined area taken as the area to be retrieved is generated as text information and the DB is retrieved on the basis of the text information.

According to the present invention, another image information is displayed in a form composed on image information displayed on a screen. With such a construction, it is possible to understanding another image information in an intended area while seeing the state of the environment and to retrieve information corresponding to that area from a DB.

According to the present invention, a retrieval condition and an area of application thereof are displayed as image data in a composite form with image information. The displayed image data is operated to determine a position at which the image data is displayed, that is, a position on image data which is an object of retrieval. The determined area is inputted as a retrieval condition representative of an area to be retrieved. With such a construction, it is possible for a user to input the area to be retrieved without referring to text information representative of the position of the image information being displayed, thereby facilitating the input of the retrieval condition and the area of application thereof.

BRIEF DESCRIPTION OF THE DRAWINGS

Further objects, features and advantages of the present invention will become more clear from the following detailed description of a preferred embodiment, described with respect to the accompanying drawing:

FIGS. 3A and 3B are diagrams showing the constructions of attribute information DB's;

FIG. 9 is a diagram showing the structure of a table in which a correspondence between the first image information and the second image information;

DESCRIPTION OF THE PREFERRED EMBODIMENTS

Embodiments of the present invention will now be explained in detail by use of the accompanying drawings.

Figure 1:
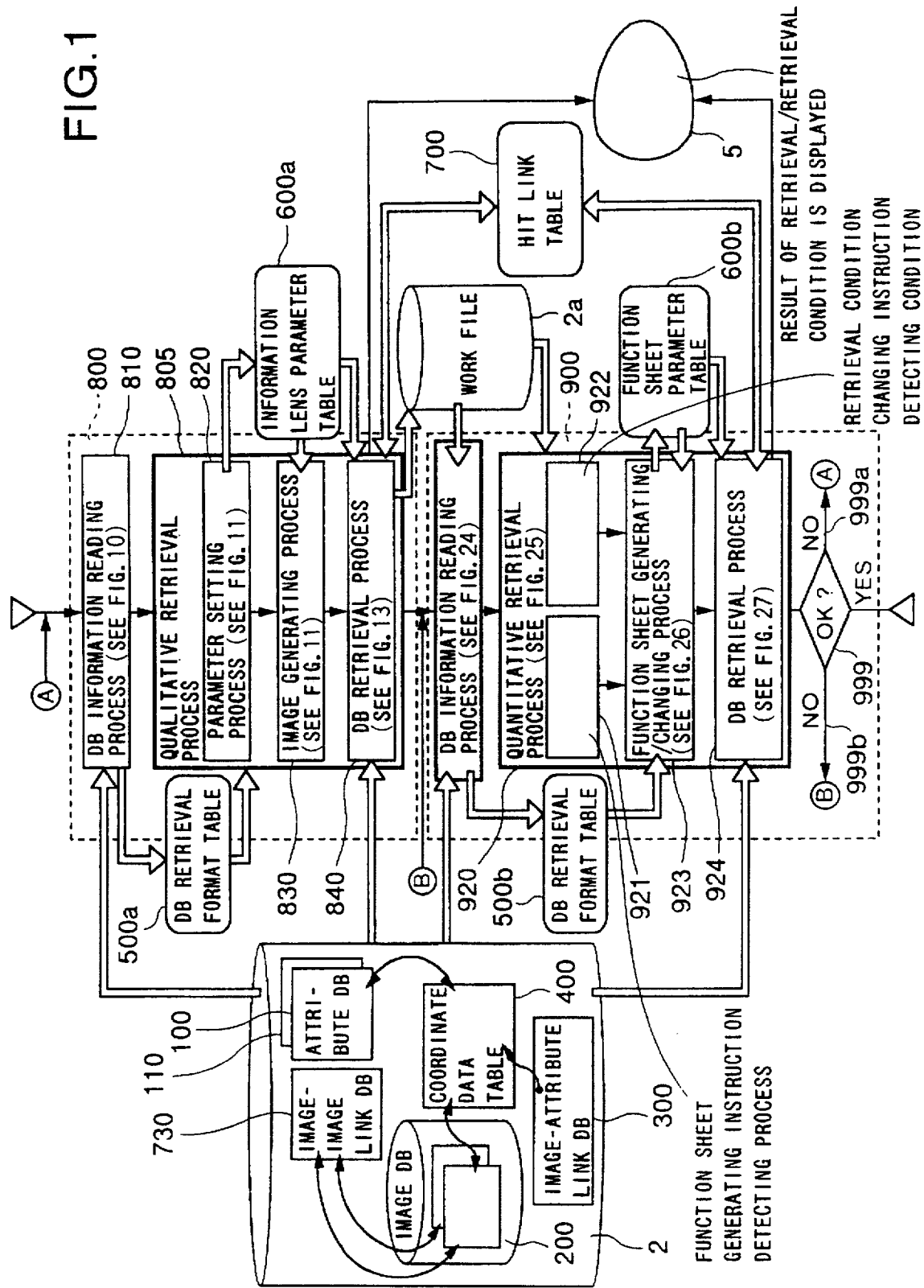
FIG. 1 is a diagram for explaining the outline of processes performed in the present invention.

FIG. 1 is a diagram for explaining the outline of processes performed in the present invention. In the overall processing shown in FIG. 1, a two-step retrieval including a qualitative retrieval (in a process block 800) and a quantitative retrieval (in a process block 900), which will be mentioned, is performed through an interactive process so that, through the processing of image information (for example, map information) having the correspondence to a DB having text information such as attribute information stored therein, text information corresponding to the map information is retrieved from the DB. In the following, the attribute information is used as the text information.

1) Qualitative Retrieval

The process block 800 includes a DB information reading process 810 and a qualitative retrieval process 805. The DB information reading process 810 includes reading image information, attribute information and information relevant thereto. The qualitative retrieval process. 805 includes making a qualitative retrieval including the partial overlaying of the second image information related with the first image information for retrieval on the first image information (or map information) or a rough retrieval with the second image information used as a retrieval key to get the result of retrieval, and storing the result of retrieval into a work file 2a. The retrieval key used in the qualitative retrieval process 805 is called an information lens. The details of the information lens will be mentioned later on. The qualitative retrieval process 805 selects information from the information read through the DB information reading process 810. The result of selection is stored in the work file 2a. The result of selection is a partial assembly of the information read through the DB information reading process 810.

2) Quantitative Retrieval

The process block 900 includes a DB information reading process 910 and a quantitative retrieval process 920. The DB information reading process 910 includes reading image information, attribute information and information relevant thereto, which are stored in the work file 2a, that is, various information selected by the qualitative retrieval. The quantitative retrieval process 920 includes making a quantitative retrieval in which the first image information is overlaid with a retrieval key called a function sheet including the composition of a quantitative retrieval condition and an image data indicative of a area of application of the retrieval condition, and displaying the result of retrieval on a display device.

In the case where the obtained result of retrieval is not preferable or in the case where another retrieval is made, either a processing (999a) including the repetition of the qualitative retrieval 800 and the quantitative retrieval 900 subsequent thereto or a processing (999b) including the repetition of only the quantitative retrieval 900 can be selected on the basis of a user's instruction.

Figure 2:
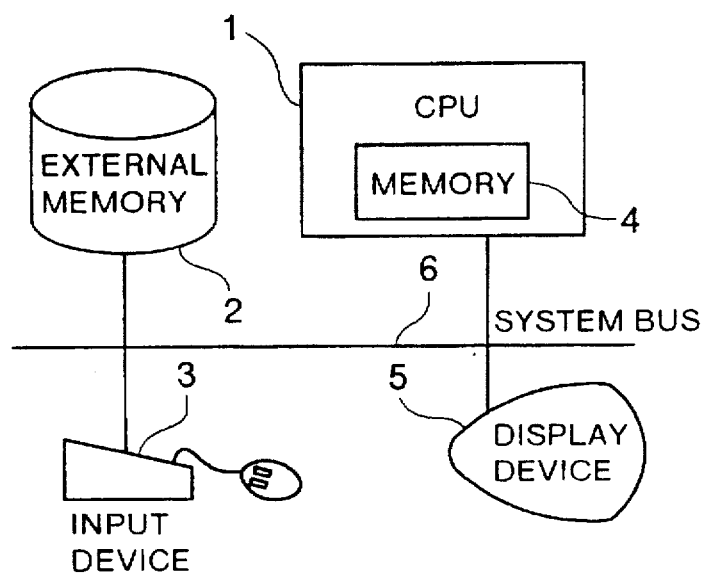
FIG. 2 is a diagram showing the construction of a computer system for embodying the present invention.

FIG. 2 is a diagram showing the construction of a computer system for embodying the present invention.

A central processing unit (CPU) 1, an external memory (storage unit) 2, an input device 3 and a display device 5 are connected through a system bus 6. Attribute information DB's 100 and 110, an image information DB 200 and a link information DB 300 are stored in the external memory 2. The CPU 1 is provided with a memory 4 which stores a program for executing the processing shown in FIG. 1 and various tables. The input device 3 includes an indicator represented by a mouse or a pen input device. The work file 2a shown in FIG. 1 is also stored in the external memory 2.

The qualitative retrieval 800 is composed of the DB information reading process 810 and the qualitative retrieval process 805. The qualitative retrieval process 805 includes a parameter setting process 820, an image information generating process 830 and a DB retrieval process 840.

In the process 810, a data format of DB retrieval condition is generated as a DB retrieval format table 500a on the basis of the attribute information DB's 100 and 110 in which attribute information is stored. Further, there are read the image information DB 200 in which image information is stored, an image-image link information DB 730 in which the correspondence between image information is stored and the image-attribute link information DB 300 in which link information for linking the image information and the attribute information DB with each other is stored. The read DB information is displayed on the display device 5.

In the process 810, image information to provide a reference (hereinafter referred to as first image information) and image information to be composed thereon (hereinafter referred to as second image information) are read so that the first image information is stored and displayed and the second image information is only stored and then fetched in the succeeding image information generating process 830. Usually, the first image information is predetermined. However, in the case where the retrieval condition is complicated, a plurality kind of second information may be read beforehand.

In a coordinate data table 400 is stored the more detailed correspondence of individual image information to each record of the DB. The coordinate data table 400 is linked with a part of the field of the DB 300. The details of the tables will be explained later on.

In the process 820, initial values concerning the information lens are set by an input from the input device 3 by a user and/or a setting values obtained from the table 500a generated in the process 810, values prepared beforehand by the system and the preceding used value, and an information lens parameter table 600a is generated by use of the inputted initial values, thereby setting parameters.

The information lens in the present invention includes the composition of a table of various parameters which represents a display method, a retrieval method and a display method of the result of retrieval and image data which represents an area to be displayed and an area to be subjected to retrieval. Image information in the display area of the information lens is called image information in lens area. An area to be displayed is called lens area and an area to be retrieved is called the focus area.

The information lens has a lens area in which the first image information is displayed in a form overlaid with a part of second information a focus and a focus area which indicates an object of retrieval of attribute information from the DB. In the case where the first image information is to be displayed in the form overlaid with the part of the second image information, the second image information is displayed in a form modified so that the correspondence thereof to the first image information is recognizable. With the overlay of the part of the second image information, a limited area of the first image information is displayed with information detailed more than its environs, thereby providing a function such as an information lens or magnifying lens for the first image information. In the case where the attribute information of DB is to be retrieved, a point a point in the image information having a correspondence to the attribute information is searched in the focus area and the DB retrieval is made by use of the correspondence to the first image information so that the result of retrieval is displayed on the displayed information by use of characters or graphics.

In the process 830, image information to be displayed on the display device 5 is generated referring to the information lens parameter table 600a generated in the process 820 and the generated image information is displayed in a composite form with image information which has already been displayed on the display device 5.

In the process 840, the DB retrieval is made on the basis of the information lens parameter table 600a generated in the process 820 and with reference to the DB 100, the DB 200, the DB 300, the table 400 and the DB 730. Further, the result of retrieval is stored into a hit link table 700 and the image data of the information lens and the result of retrieval are displayed.

The correspondence of the processes 810, 820, 830 and 840 to the flow charts of FIGS. 10 to 13 is indicated in the blocks of FIG. 1.

FIGS. 3A and 3B show the attribute information DB's 100 and 110 stored in the external memory 2. In the present embodiment, the DB 100 and the DB 110 are considered as the attribute information DB's. One DB or three or more DB's may be used. Also, in the case where a plurality of image information DB's and a plurality of attribute information DB's are linked in various combinations, the combination of image information to be first displayed and an attribute information DB is determined by a user in the DB information reading process 810 and the combination of the image information and the attribute information DB is changed in the parameter setting process 820 in accordance with the situation of retrieval.

According to the present embodiment, in the case where a plurality of DB's are used, the plurality of DB's can be referred through a kind of image information.

As shown in FIG. 3A, the attribute information DB 100 includes the columns of DB number 101, record number 102, attribute number 103, full name 104, sex of subscribers 105, address 106 and birth data 107. The DB number 101 is a number peculiar to each DB. The DB number may be code data representative of the name of each DB if it is a unique number to the DB. The record number 102 is a consecutive number for distinguishing records in the DB from each other and may serve for the attribute number 103, too. Each of the columns 104 to 107 includes attribute information data of attributes adapted for the contents of that item. For example, a character string is stored in the column 104 and the value of 0 or 1 is stored in the column 105.

As shown in FIG. 3B, the attribute information DB 110 includes the columns of DB number 111, record number 112, attribute number 113, name of householder 114, address 115, site area 116 and name of landowner 117. Since each column is fundamentally similar to that in the DB 100, the detailed explanation thereof will be omitted. It does not necessarily follow that the item of each of the columns 113 to 117 is the same in the respective attribute information DB's.

Figure 4:
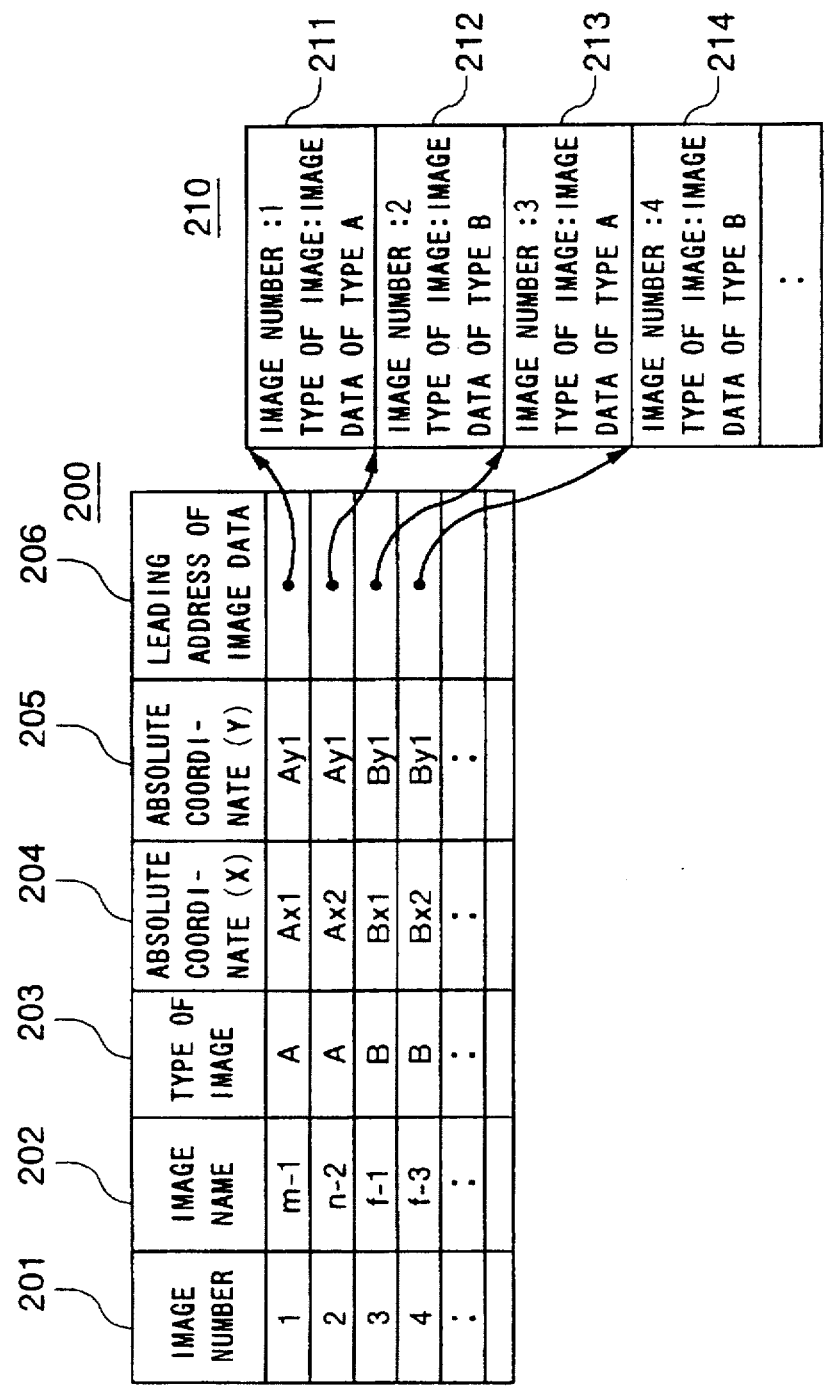
FIG. 4 is a diagram showing the construction of an image information DB.

FIG. 4 shows the table structure of the image information DB 200 and an image data storage table 210. In the present embodiment, a map is used as one example of image data. Maps represented by image data (or image maps) are stored in the columns 211, 212, 213, 214,—of the table 210. In the case where there is a positional relation between image information of the image maps, the image information is managed by defining an origin for the image data to be displayed and moving each of the image information on the basis of the origin in order to represent the positional relation. The origin is defined in a coordinate system. This coordinate system is called absolute coordinate system and coordinates in the absolute coordinate system are called absolute coordinates.

The image information DB 200 includes the columns of image number 210, image name 202, type of image information 203, X and Y coordinates 204 and 205 of the absolute coordinates of the origin of the image, leading address 206 of the image information storage table. The image number is a number for distinguishing each image information uniquely. The image name represents the contents of the image by a character string. The type of image information is data representative of the type or kind. For example, in the case where the image information is a map, the type of image information is a map or the like represented by a residential map, a topographic map and an aerial photograph. The type of image information includes the scale and accuracy of the map. In the case where the image information is a blueprint, the type of image information is data representative of the type of the blueprint such as front view, side view, layout, sketch drawing and cross section. Namely, the image name and the type of image information are information which provides marks of representation of the contents of the image by code or text information.

Though not shown, image information representing the contents of each image information may be prepared separately. Such image information includes, for example, image information reduced to an extent in which the outline of the image information is recognizable, the version of representation of image information photographed by a camera or television camera, or a handwritten drawing.

Figure 5:
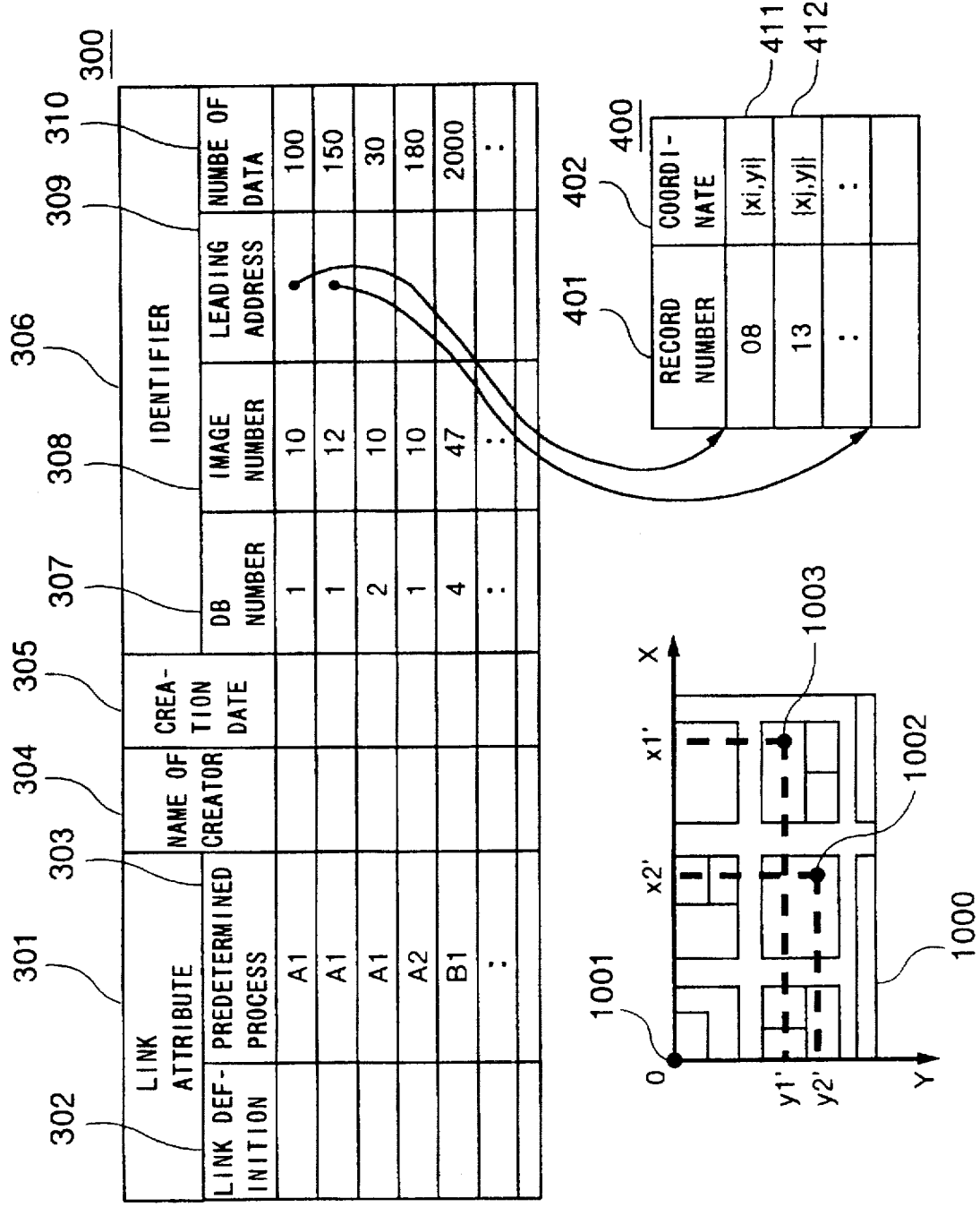
FIG. 5 is a diagram showing the construction of an image-attribute link information DB in which the correspondence of the attribute information DB to the image information DB is stored.

FIG. 5 shows the table structure of the link information DB 300 in which link information representing the correspondence of the first image information to text information or attribute information is stored and the coordinate data table 400 which represents the more detailed correspondence.

Link information representing the correspondence of image information to text information includes primary link information and secondary link information. The primary link information includes the combination of the record number of each record of DB and coordinate data representative of an object in image information corresponding to that record and is stored in the table 400. An assembly including at least one primary link information is called secondary link information, and link information concerning the secondary link information is stored in the DB 300.

The secondary link information is composed of link attribute, the name of a creator of link information, creation date and identifier which are stored in the columns 301 to 310 of the DB 300. The link attribute 301 includes link definition 302 and predetermined process 303. The identifier 306 includes a DB number 307, an image number 308, a leading address 309 of the table 400 in which the primary link information forming the secondary link information is stored, the number 310 of primary link information. The predetermined process is a processing for performing a predetermined process in accordance with an input for information indicated by the identifier. For example, the predetermined process, in the case where attribute information is changed, is a process for correcting image information with a correspondence to the changed attribute information in accordance with a predetermined method.

Though an origin 1001 of image information 1000 is represented in the absolute coordinate system of the image information DB, as has already been mentioned, the coordinates in the table 400 are represented in terms of a coordinate system for each image (or relative coordinate system). Each object in image information is generally represented by a plurality of coordinates but may be represented by a representative point 1002 or 1003 provided in that object.

The provision of a representative point representing an object, as shown in FIG. 5, reduces a retrieval throughput at the time of retrieval of primary link information from an area to be retrieved, thereby enabling more rapid retrieval.

Figure 6:
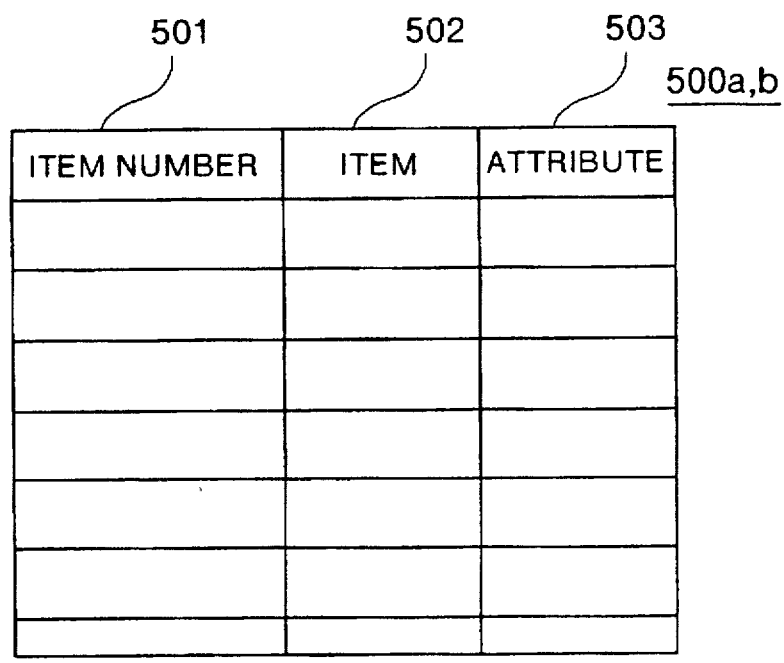
FIG. 6 is a diagram showing the structure of an information lens or a function sheet format table.

FIG. 6 shows the structure of the DB retrieval format table 500a. The table 500a includes the columns of item number 501 for distinguishing the item of a retrieval condition, content of item 502 and attribute of item 503. The contents of the attribute information DB's 100 and 110 are copied into those columns with the reference being made to the DB's.

Figure 7:
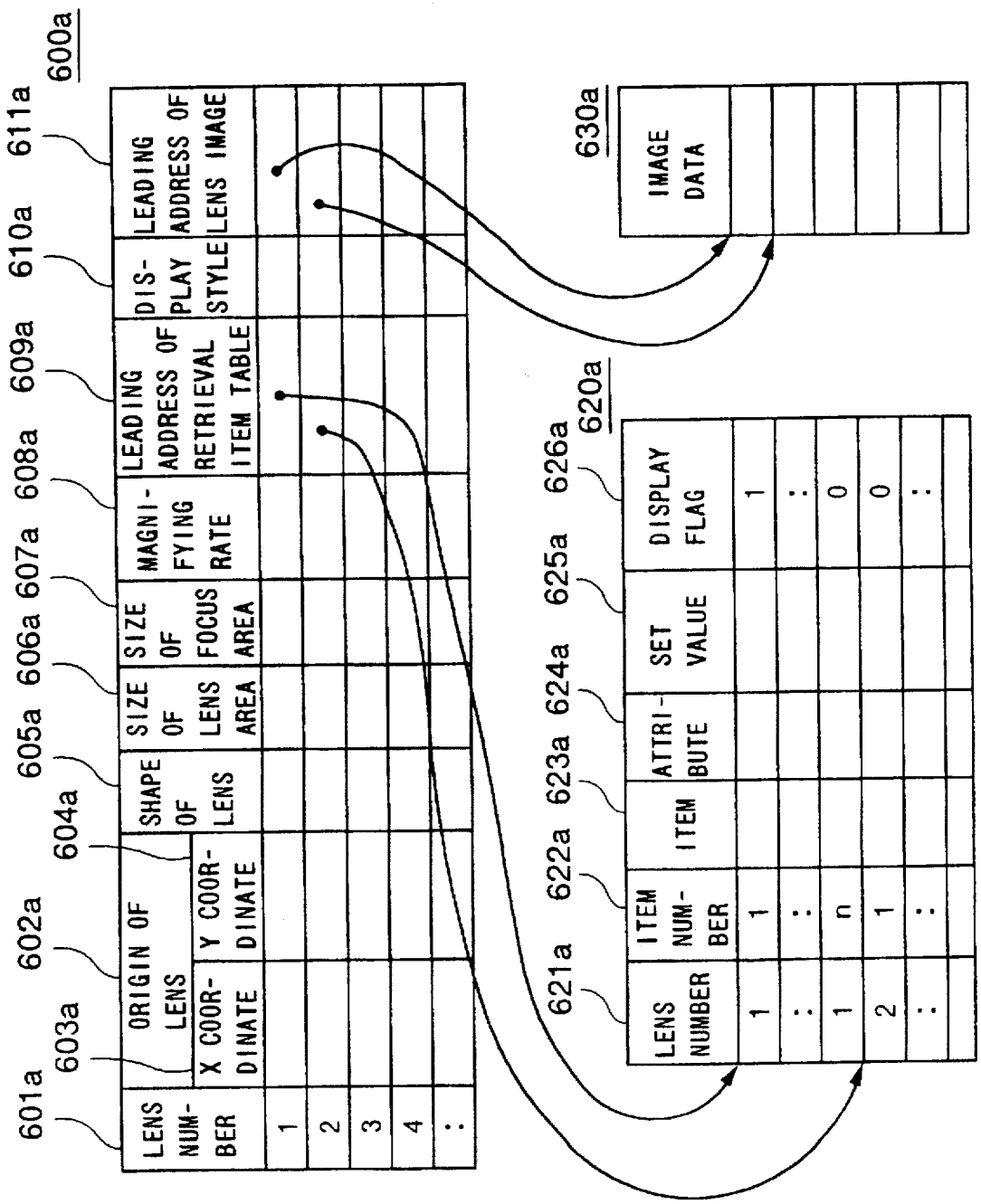
FIG. 7 is a diagram showing the structure of an information lens or an information lens parameter table in which retrieval conditions are stored.

FIG. 7 shows the structure of the information lens parameter table 600a, a retrieval item table 620a and an image data storage table 630a.

The table 600a includes the columns of lens number 601a peculiar to each information lens, origin of lens 602a which is the origin of a position representing the information lens, shape of lens 605a, size of lens area 606a, size of focus area 607a, magnifying rate 608a, leading address 609a of the retrieval item table 620a in which retrieval items are stored, display style 610a of the result of retrieval and image data 611a of the information lens. The lens area and the focus area of the information lens can be determined by providing the columns of X and Y coordinates 603a and 604a of an origin determinative of a position on image information in the column 602a of origin of lens, providing the focus area and the lens area with similar figures and predetermining a positional relation between the focus area and the lens area.

In the present embodiment, examples of the shape of the information lens include rectangle, circle and polygon. However, a region enclosed by a free curve or a specified shape beforehand registered may be used in accordance with image information to be subjected to retrieval. For example, in the case where a map is used as image information, a figure can be used which represents administrative districts or an area along a certain road. Since the shape of the lens can thus be changed in accordance with the object of retrieval, analysis adapted for the property of an area becomes possible.

The retrieval item table 620a includes the columns of lens number 621a, item number 622a, item 623a, attribute 624a, set value 625a and display flag 626a of the result of retrieval. The image data storage table 630a may be integrated into the information lens parameter table 600a. However, when considering the fact that the table 600a includes text or code information, it is preferable that the table 630a is provided in a separate storage area as in the present embodiment.

Figure 8:
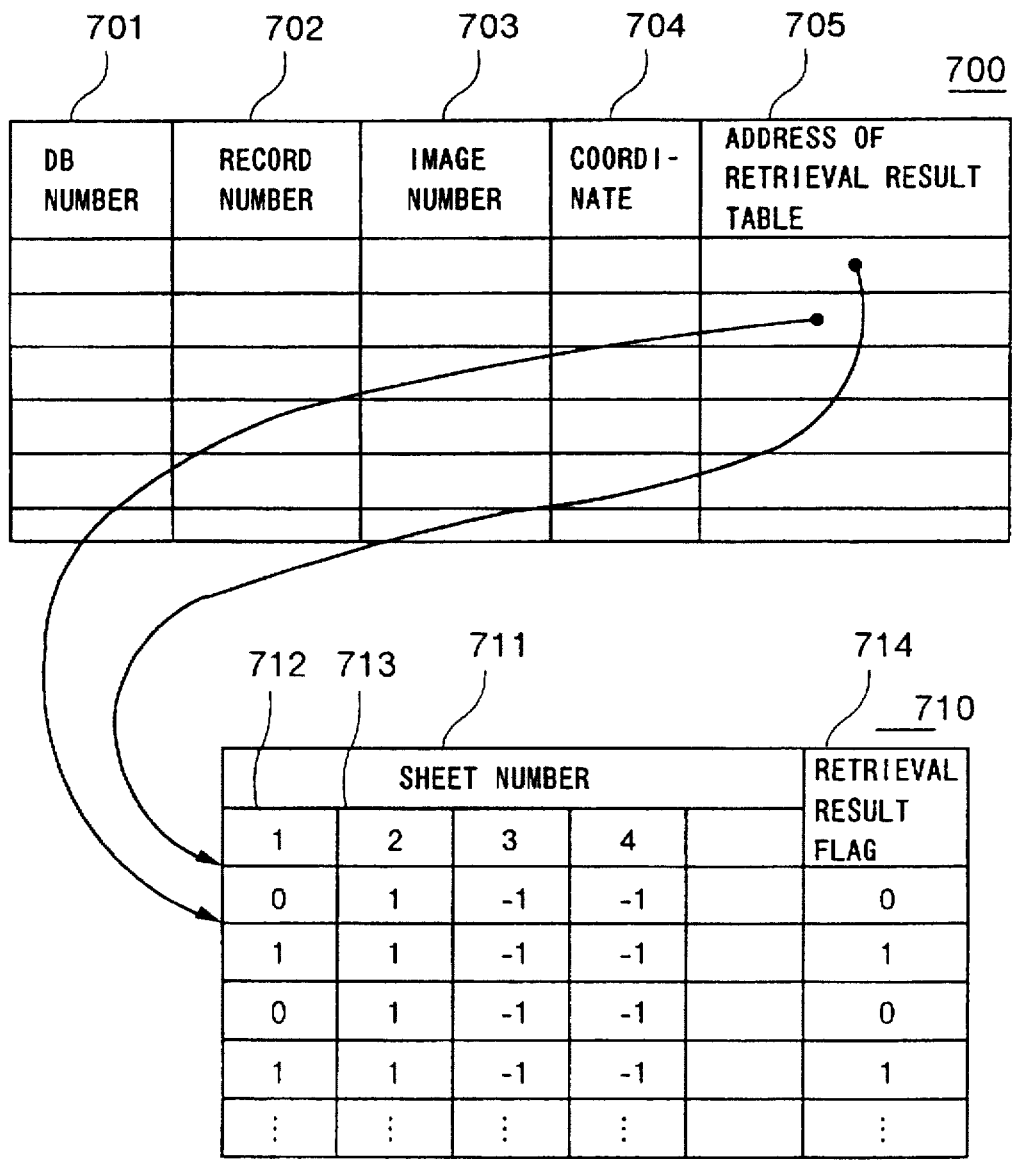
FIG. 8 is a diagram showing the structure of a table in which data concerning hit link points is stored.

FIG. 8 shows the structure of the hit link table 700. The table 700 includes the columns of DB number 701, record number 702, image number 703, coordinate 704 and leading address 705 of a retrieval result table 710 in which the results of retrieval are stored. The table 710 includes the columns of sheet number 711 and retrieval result flag 714. The sheet number column 711 is used when the retrieval with function sheet which will be mentioned later on. The column 711 is provided with the number equal to the number of function sheets generated.

FIG. 9 shows the structure of a correspondent point setting table stored in the image-image link information DB 730. The table 730 includes the columns of consecutive number 731 peculiar to a pair of a correspondent points, coordinates 732 of a correspondent point on the first image information indicating the pair of correspondent points, and coordinates 733 of a correspondent point on the second image information corresponding to the coordinates 732.

A quantitative retrieval With information lens will be explained along the following procedure.

First, the DB information reading process 810 shown in FIG. 1 will be explained using FIG. 10 in reference to a displayed example shown in FIG. 14. Next, the parameter setting process 820 and the image information generating process 830 will be explained using FIG. 11 in reference to displayed examples shown in FIGS. 15 and 16. Further, a retrieval condition setting process as a part of the parameter setting process 820 will be explained using FIG. 12 in reference to a displayed example shown in FIG. 17. Finally, the DB retrieval process 840 will be explained using FIG. 13 and a displayed example of the result of retrieval will be shown in FIG. 18.

Figure 10:
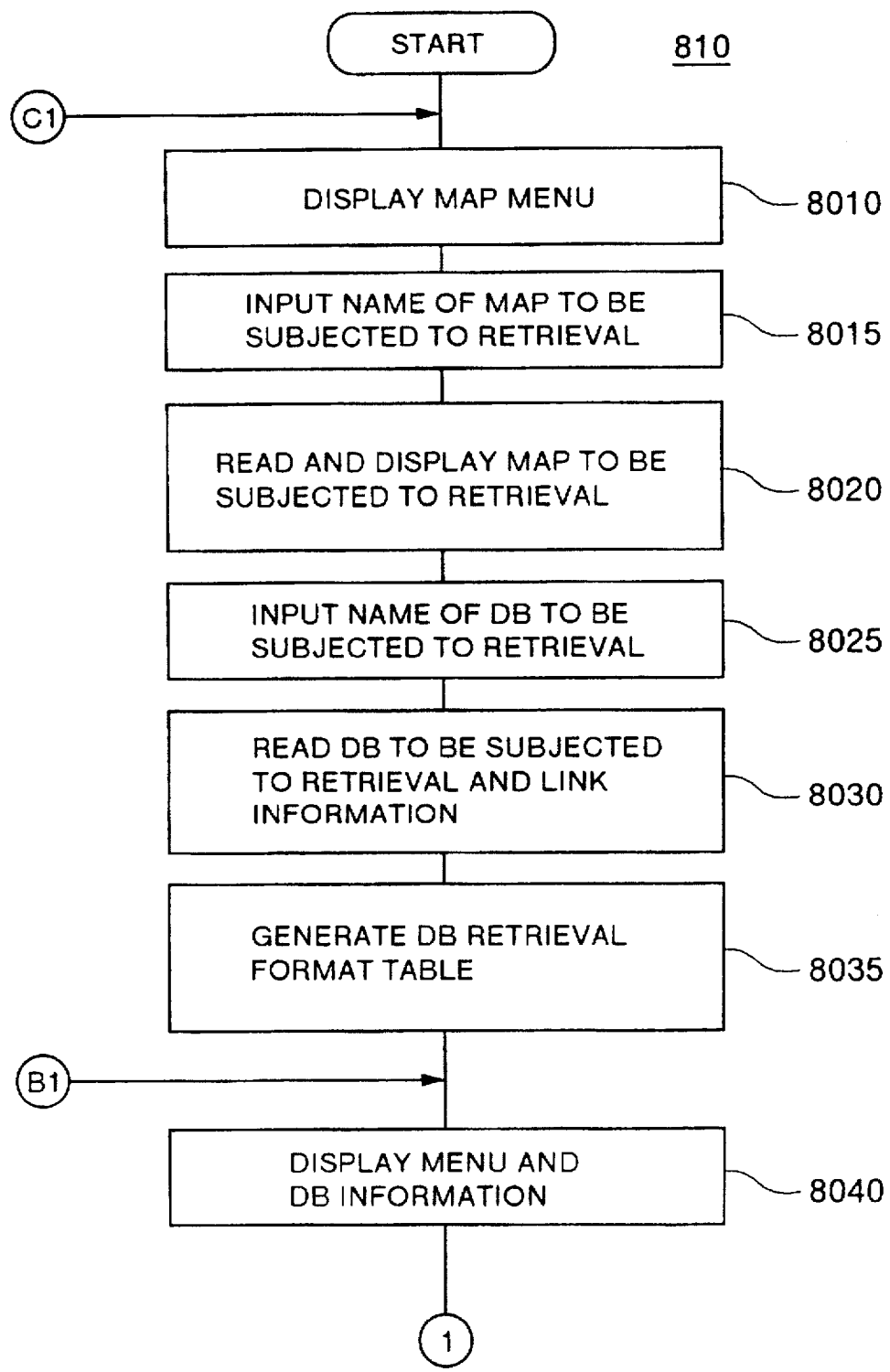
FIG. 10 is a flow chart showing a DB information reading process.

FIG. 10 shows a flow chart of the DB information reading process 810.

When the system is started, the contents of the columns of the image name 202 and type of image 203 in the image information DB 200 are displayed as map menus on the display device 5 (step 8010). When the map name of a map to be subjected to retrieval is inputted by the input device (step 8015), the corresponding image information data is read from the image information DB 200 and is displayed on the display device 5 (step 8020). At this time or simultaneously, the image number is read.

In the present embodiment, only the map name is inputted. However, if one can be specified from various maps, an image number associated with a map to be subjected to retrieval may be inputted when the map is designated by the selection of a reduced image, the selection of a schematically represented menu, and so forth.

Next or when the name of a DB to be subjected to retrieval is inputted by the input device 3 (step 8025), the DB number 101 or 111 of a DB corresponding to the inputted DB name is read from the attribute information DB. On the basis of the image number (or map name) and the DB number is read link information of the link information DB 300 (step 8030). And, a DB retrieval format table 500a is generated referring to items of the attribute information DB and the attributes of the items (step 8035).

As has been mentioned above, the format for DB retrieval is generated referring to the attribute information DB. Therefore, a user can set a retrieval item even if the user does not know the contents of the attribute information DB beforehand.

A menu for retrieval and the read DB information are displayed on the display device 5 and there turns into a waiting condition until there is an input from the user (step 8040). An example of the display screen at this time is shown in FIG. 14. As shown in FIG. 14, the menu includes a menu 1010 for designating a map and a DB to be subjected to retrieval and a menu 1013 for making a retrieval with information lens. The menu 1013 includes the areas of "GENERATE" 1014a, "CONDITION" 1015a and "END" 1016. When each area is selected, the corresponding mode is set.

Figure 14:
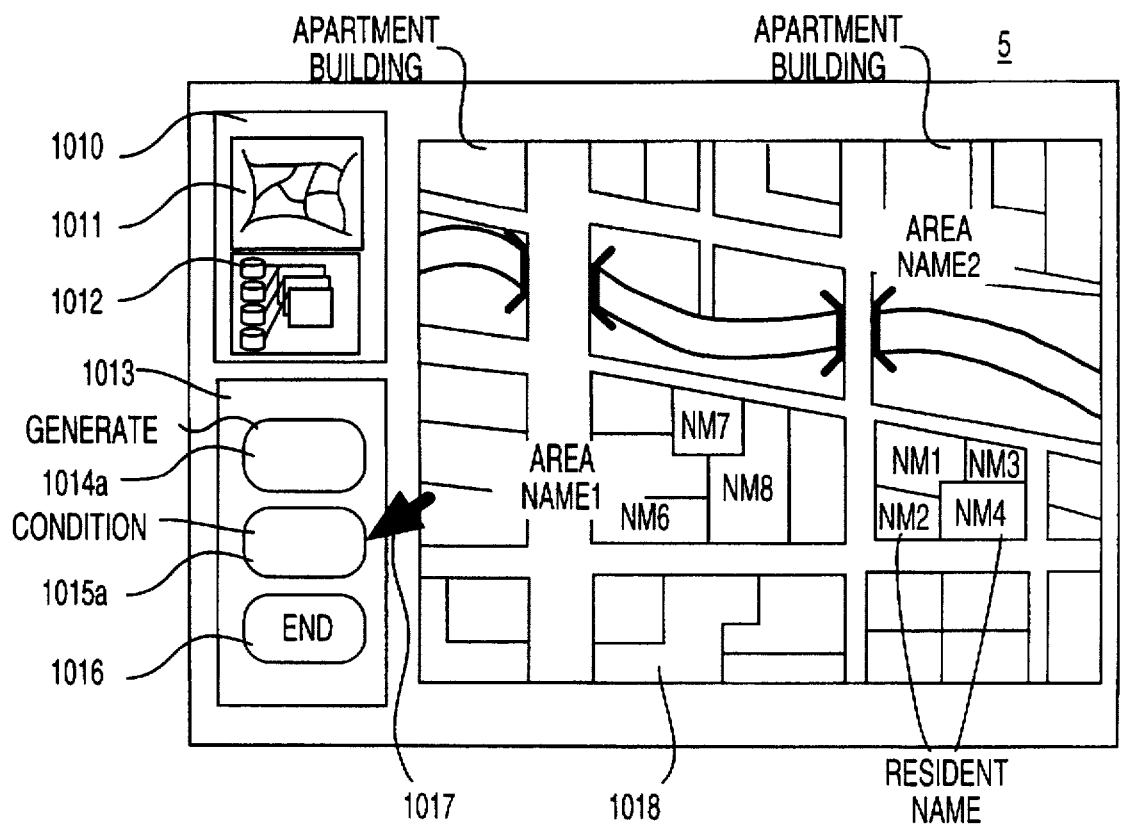
FIG. 14 shows a displayed example of a retrieval menu and DB information.

The menu 1010 shown in FIG. 14 includes an area 1011 for designating a map to be subjected to retrieval and an area 1012 for designating an attribute information DB to which the reference is to be made. While seeing a reduced map displayed in the area 1011, the user can select the corresponding DB from the DB's displayed in the area 1012. The menu 1013 includes an area 1014a for indicating the start of retrieval using an information lens, an area 1015a for indicating the setting or change of a retrieval condition, and an area 1016 for indicating the end of the system.

The selection of an area in the menu is realized by moving an area designating input mark or a cursor 1017 into the area and inputting an instruction for area selection by an input device such as mouse. An area to be selected is called button. In the following, the selection of an area is expressed as selecting a button in order to make a distinction from the depression of a button of an input device.

An area 1018 is an area for displaying image information or DB information that includes a map section showing apartment buildings and single family residences displayed with the names of the residents NM1–NM4 and NM6–NM8, for example. Although the names NM1, etc. are shown displayed for only a few residences, it is understood that names are displayed for each of the residences and buildings and that additional names for the other buildings shown are omitted from the figure for clarity.

Next, the parameter setting process 820 will be explained using FIG. 11.

After the menu and the DB information have been displayed, as shown in FIG. 14, the judgement is made as to whether or not the menu 1010 is selected (step 8045). The flow returns to step 8010 if the menu is selected and proceeds to step 8050 if the menu is not selected.

In step 8050, the judgement is made as to whether or not the button 1016 is selected. If the button 1016 is selected, the processing is completed. If the button 1016 is not selected, the flow proceeds to step 8055.

In step 8055, the judgement is made as to whether or not the button 1014a or 1015a is selected. If the button 1015a is selected, a retrieval condition setting/changing mode is set or the flow branches to step 8060 to perform the processings of steps 8060, 8065 and 8070 and the flow then proceeds to step 8080. If the button 1014a is selected, a retrieval mode is set or the flow goes to step 8075. If neither the button 1014a nor 1015a is selected, the flow goes to step 8078.

Figure 15:
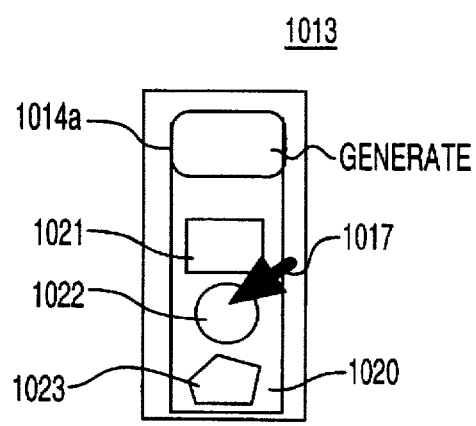
FIG. 15 shows a displayed example of a menu in the designation of the shape of an information lens.

In step 8060, a condition setting mode is first set. Next, in the case where the tables 600a and 620a have not been generated, the tables 600a and 620a are generated and a lens number of the column 601a is set while a menu 1020 for designating the shape of an information lens, as shown in FIG. 15, is displayed on the menu 1013. In the case where anyone in the menu 1020 is selected or after a fixed time has been elapsed after the display of the menu 1020, the former display shown in FIG. 14 is restored. The menu 1020 includes a plurality of areas for designating the shape. For example, areas 1021, 1022 and 1023 are menus for designating a rectangular area, a circular area and a freely set area, respectively, as the shape of an area to be retrieved.

In the case where the tables 600a and 620a have been generated, there occurs a condition of waiting for the selection of an information lens to be subjected to the change of the retrieval condition. At this time, the display urging the user to select may be made in such a manner that information lenses selectable by the user are displayed with different colors, as shown by shaded portions 11036a and 11036b in FIG. 16B.

In step 8065, image data of the information lens is generated referring to the parameter table 600a generated in step 8060 and is displayed. Further, a retrieval condition settlement button 1031 and a condition setting/changing button 1032 (see FIG. 16A) are displayed on the menu 1013. The retrieval condition settlement button 1031 and the condition setting/changing button 1032 will be explained in conjunction with step 8070.

Figure 16A:
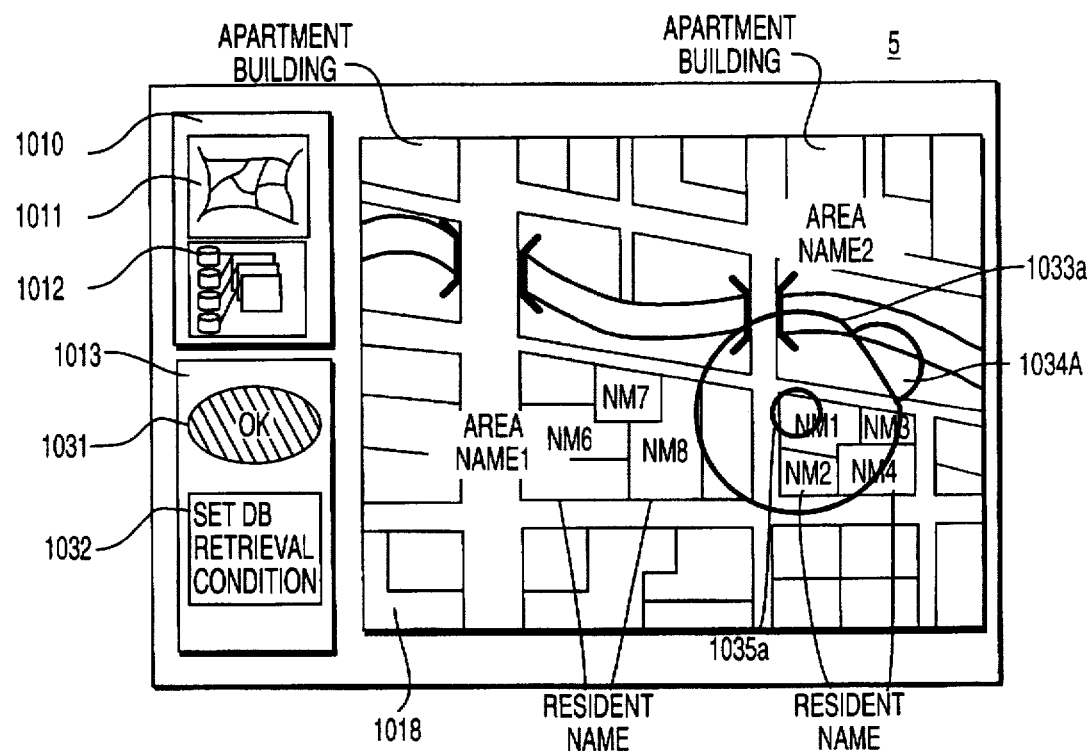
FIGS. 16A and 16B show a displayed example of the overlaying of image information by a lens.
Figure 16B:
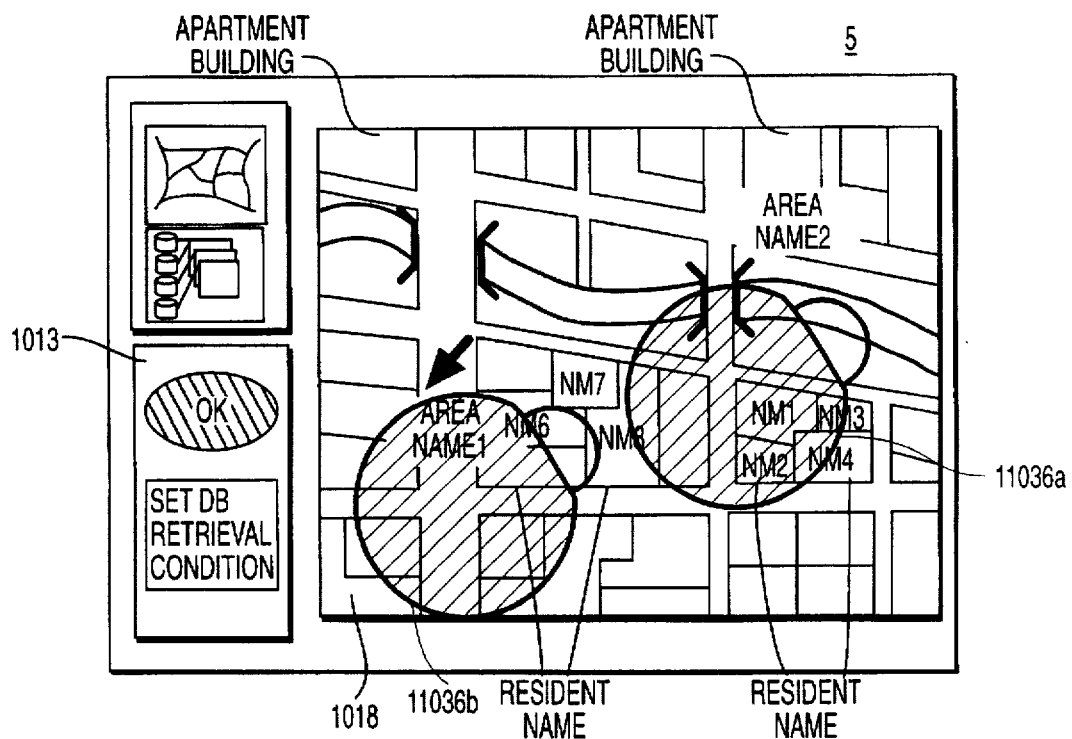

The information lens is displayed by circles 1033a and 1035a and a semicircle 1034a shown in FIGS. 16A. Reference numeral 1033 denotes a lens area, numeral 1035 a focus area, and numeral 1034 a retrieval condition setting/changing button. The function of the button 1034 is similar to that of the button 1032.

In step 8070, a retrieval condition is inputted from the input device 3 and parameters are set into the parameter table 600a. The details of step 8070 will be explained using FIG. 12.

Figure 17A:
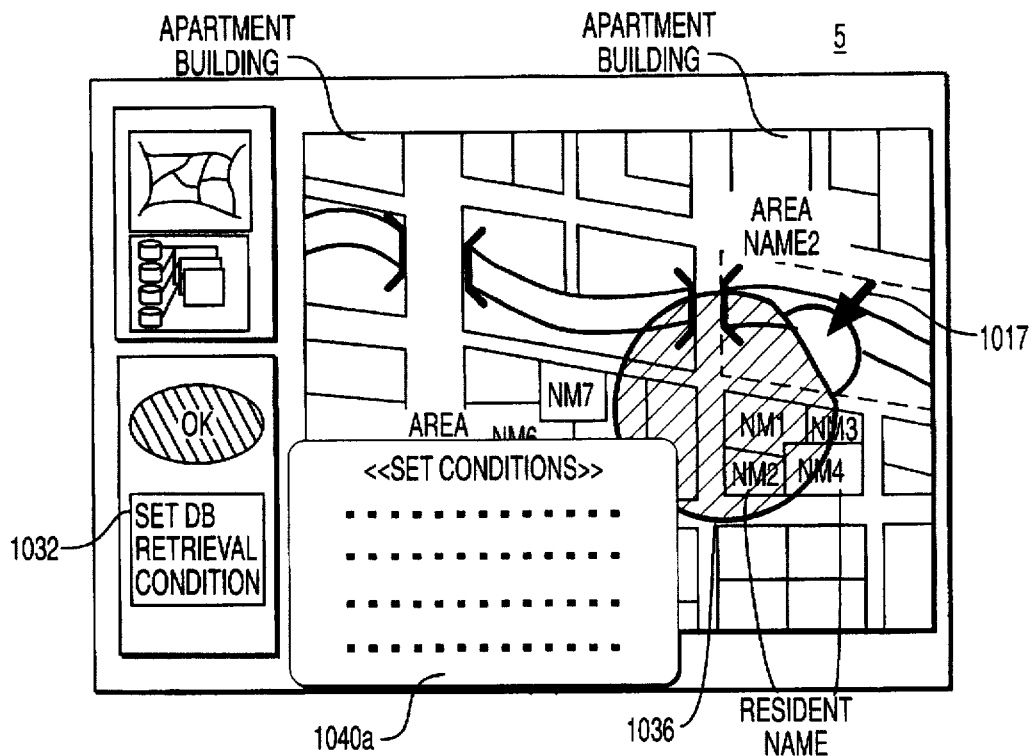
FIGS. 17A and 17B show a displayed example of a retrieval condition setting menu.

When the button 1032 or 1034 shown in FIG. 16A is selected, a window 1040a for DB retrieval condition setting, as shown in FIG. 17A, is displayed on the display device 5 (step 80701). This window is generated referring to the table 620a. In step 80702, a display style, a set value for a retrieval item and an instruction for whether or not the result of retrieval for the retrieval item should be displayed are inputted from the input device 3. The input of those values is accepted until the settlement menu 1031 is selected. In the case where the settlement menu 1031 is selected (step 80703), the display of the window 1040a is erased and the inputted parameters are stored into the tables 600a and 620a (step 80704).

Figure 17B:
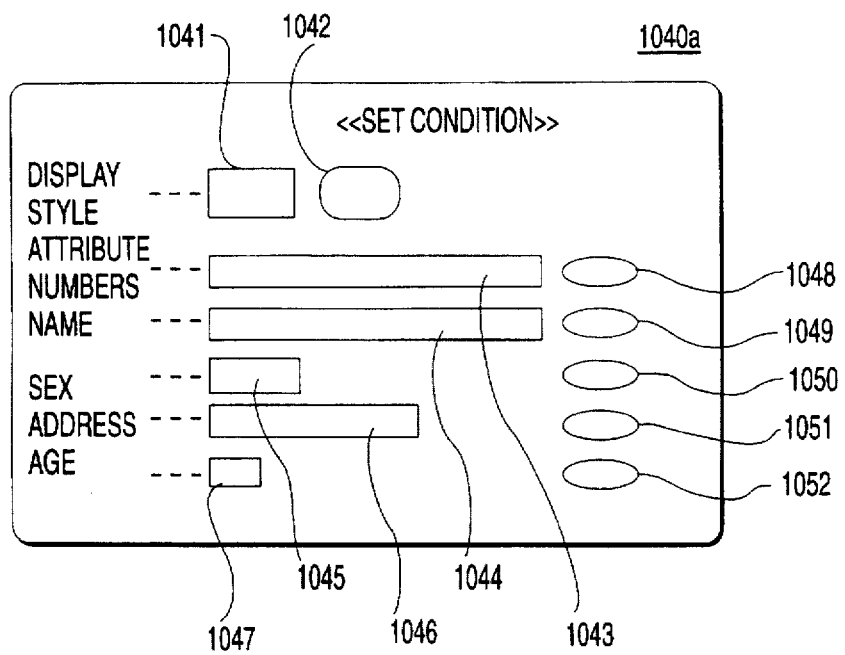

An example of the window 1040a will now be explained briefly by use of FIG. 17B. The window 1040a is composed of input areas 1041 and 1042 of display style, input areas 1043 to 1047 for set values for retrieval items, and areas 1048 to 1052 for setting the presence/absence of display of the retrieval results for the retrieval items 1043 to 1047.

When the settlement menu 1031 is selected, the set conditions are stored into the tables 600a and 620a (step 80704) and the information lens is displayed on the display device 5 (step 80705).

As has been mentioned above, the values of the table 600a are set or changed. At this time, in the case where there are a plurality of image information read in the process 810, image information made an object of determination of the focus area is set.

On the other hand, in the case where the result of judgement in step 8055 shows that the menu or button 1014a is selected, a predetermined value is set into the table 600a if one information lens is not set in the table 600a, and an information lens is displayed on the basis of the set value (step 8075). Further, image information made an object of determination of the focus area is set. In the case where neither the menu 1014a nor the menu 1015a is selected, the judgement is made as to whether or not there is the input of movement or modification for the information lens (step 8078). If there is the input, the flow proceeds to step 8080. If there is no input, the flow returns to step 8040.

With the above processing, the information lens is displayed and the flow proceeds to step 8080. In step 8080, the positions of the lens area and the focus area are detected and these areas are determined and are stored into the table 600a. If a relation between the lens area and the focus area is defined beforehand, the storage of the origin and area of the lens area and the size of the focus area suffices.

Next, the image information generating process 830 is performed in steps 8085 and 8090 so that image information to be displayed in the lens area is generated and displayed on the display device 5.

The second image information read in the process 810 is modified on the basis of the parameter concerning the lens area and the magnifying rate which are stored in the parameter table 600a and the correspondence of the first image information to the second image information which is stored in the image-image link information DB 730, so that image information in the lens area is generated. The modifying process will be explained later on.

In step 8090, an image generated in step 8085 is displayed on the display device in a composite form with the corresponding portion of the first image information. Since the overlaying or overlapping display of a plurality of image information can be realized by the prior art, the explanation thereof will be omitted.

Figure 18:
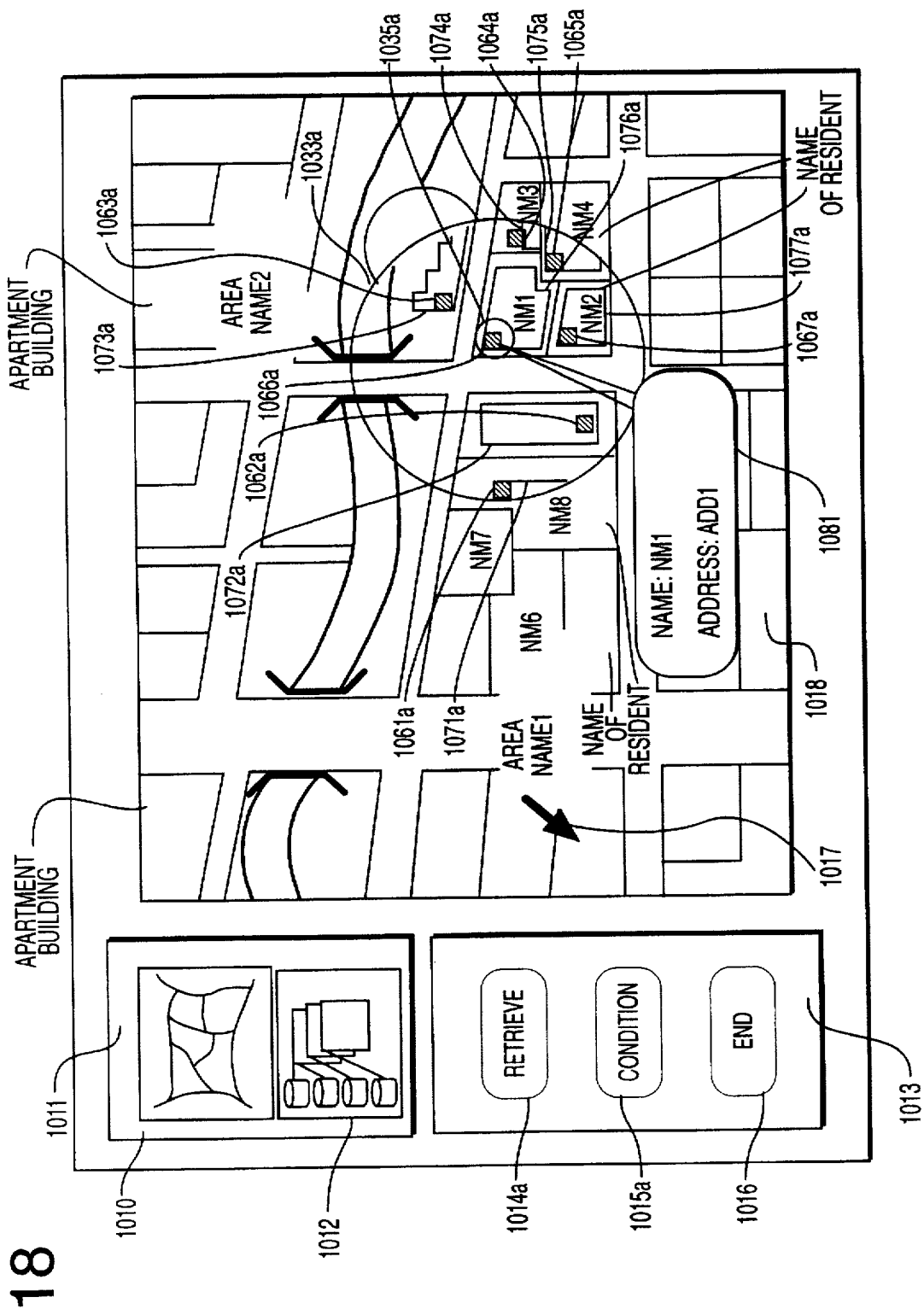
FIG. 18 shows a displayed example of the result of retrieval with lens.

A displayed example of first image information composed with second image information in a lens area is shown in FIG. 18. The first image information is displayed in the display area 1018 and the second image information or image information in lens area is displayed in the area 1033a in a composite form with the first image information. Displayed contents 1071a to 1077a are image information generated on the basis of the second image information.

Figure 20A:
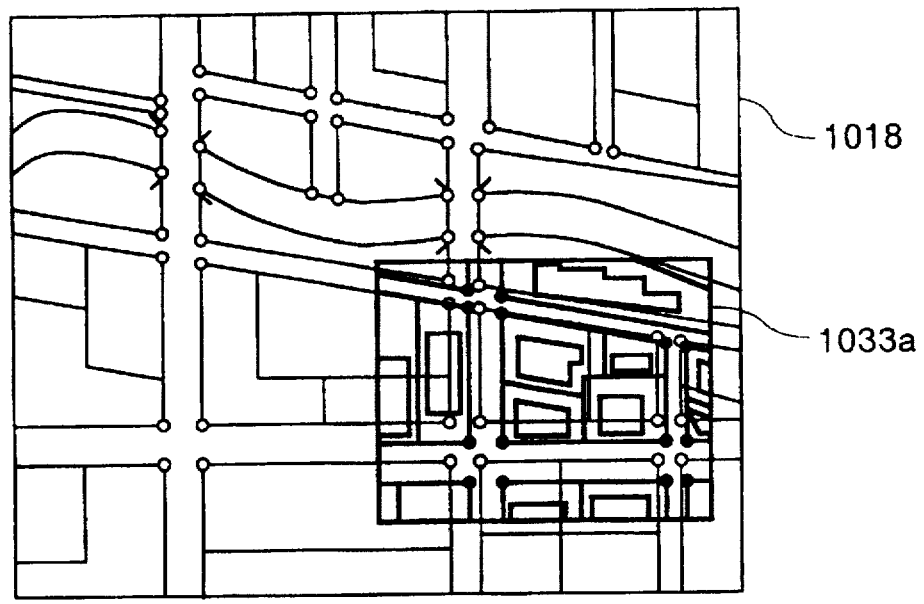
FIGS. 20A and 20B show a displayed example on a screen before and after the transformation for image positioning.

The process for modifying the second image information will be explained using FIGS. 19 to 22. The modifying process the two following processes:

(1) a "magnifying process" available in the case where a user grazes steadily at an overlaying area or in the case where a plurality of DB's have a correspondence to one image information; and (2) a "transforming process" available in the case where the deviation of image information is caused, as shown in FIG. 20A, when a plurality of image information are overlaid on the basis of the origin of image information stored in the image information DB 200.

Figure 19:
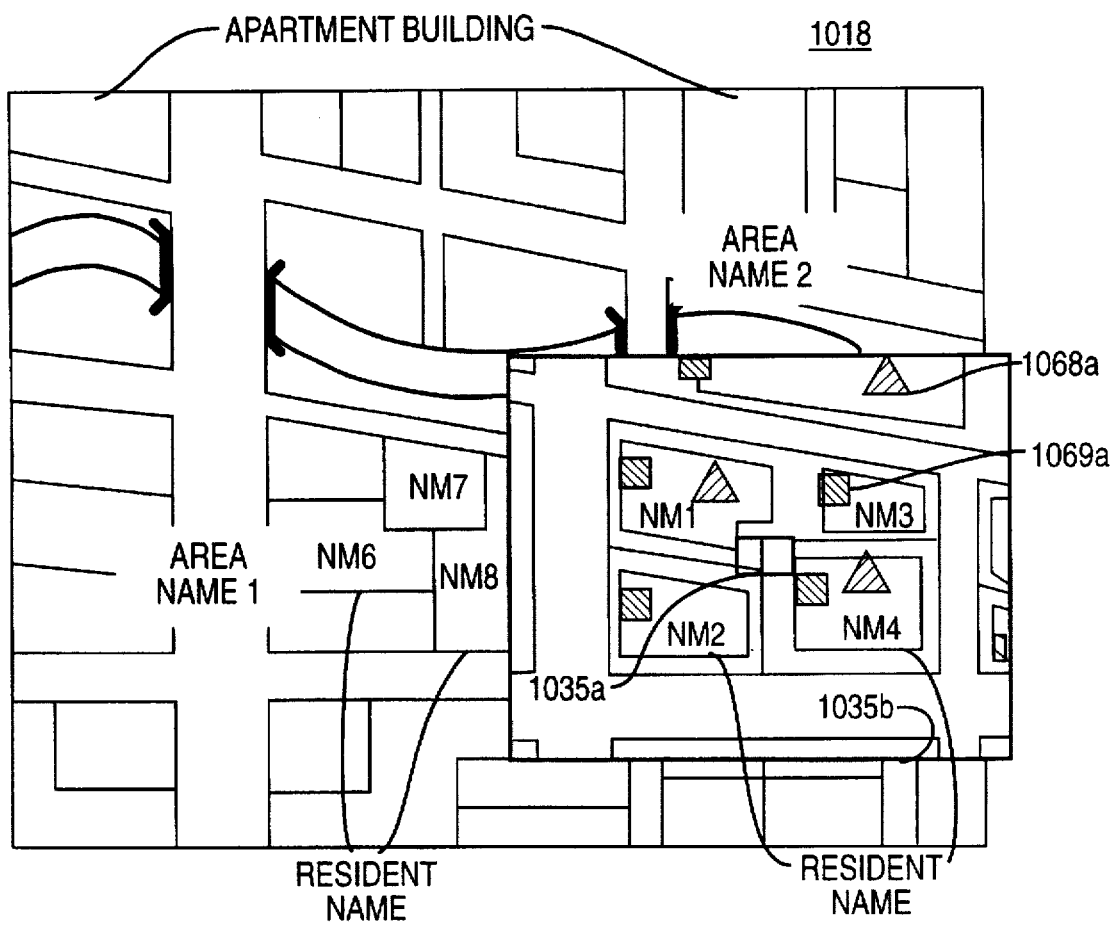
FIG. 19 shows a displayed example of the overlaying of image information with magnified image information.

In the magnifying process, image information in lens area is generated in a version magnified on the basis of the magnifying rate of the table 600a. The magnifying rate is set to 1 beforehand. In the case where the image information in lens area is to be generated by the magnifying process, a magnifying rate is set in step 8070. A displayed example of image information subjected to the magnifying process is shown in FIG. 19. Marks 1068a and 1069a indicate that a correspondence is made to different DB's.

In overlaying the first image information with the second image information, the display area and display style (or magnification/reduction) of the second image information can be set arbitrarily on the basis of the user's instruction, as mentioned above. Therefore, the present invention provides the following effects.

(a) Since an area overlaid with the second image information is limited to only a necessary portion of the first image information, it is possible to prevent the overlaying of image information from causing the increase of in amount of the displayed information in the whole of the same area, which increase is caused in the prior art. As a result, it is possible to avoid a problem that, due to the excess of information or the overlaying of characters or symbols on a map, the user may take a considerable time for searching for necessary information or may overlook the necessary information.

(b) Since there is always displayed the whole of the first image information which the second image information is to overlay, the user can designate precisely an area to be overlaid with the second image information while seeing the first image information.

Figure 20B:
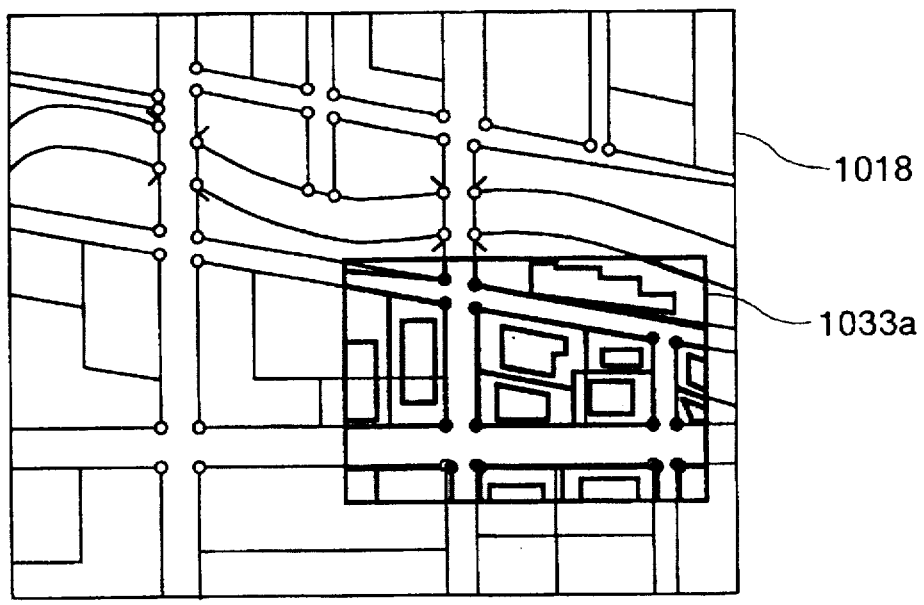

On the other hand, the transforming process available in the case where first image information and second image information are displayed overlaying with a deviation from each other, as shown in FIG. 20A, is performed for displaying both the image information with a matching correspondence of image information to each other, as shown in FIG. 20B.

Figure 21:
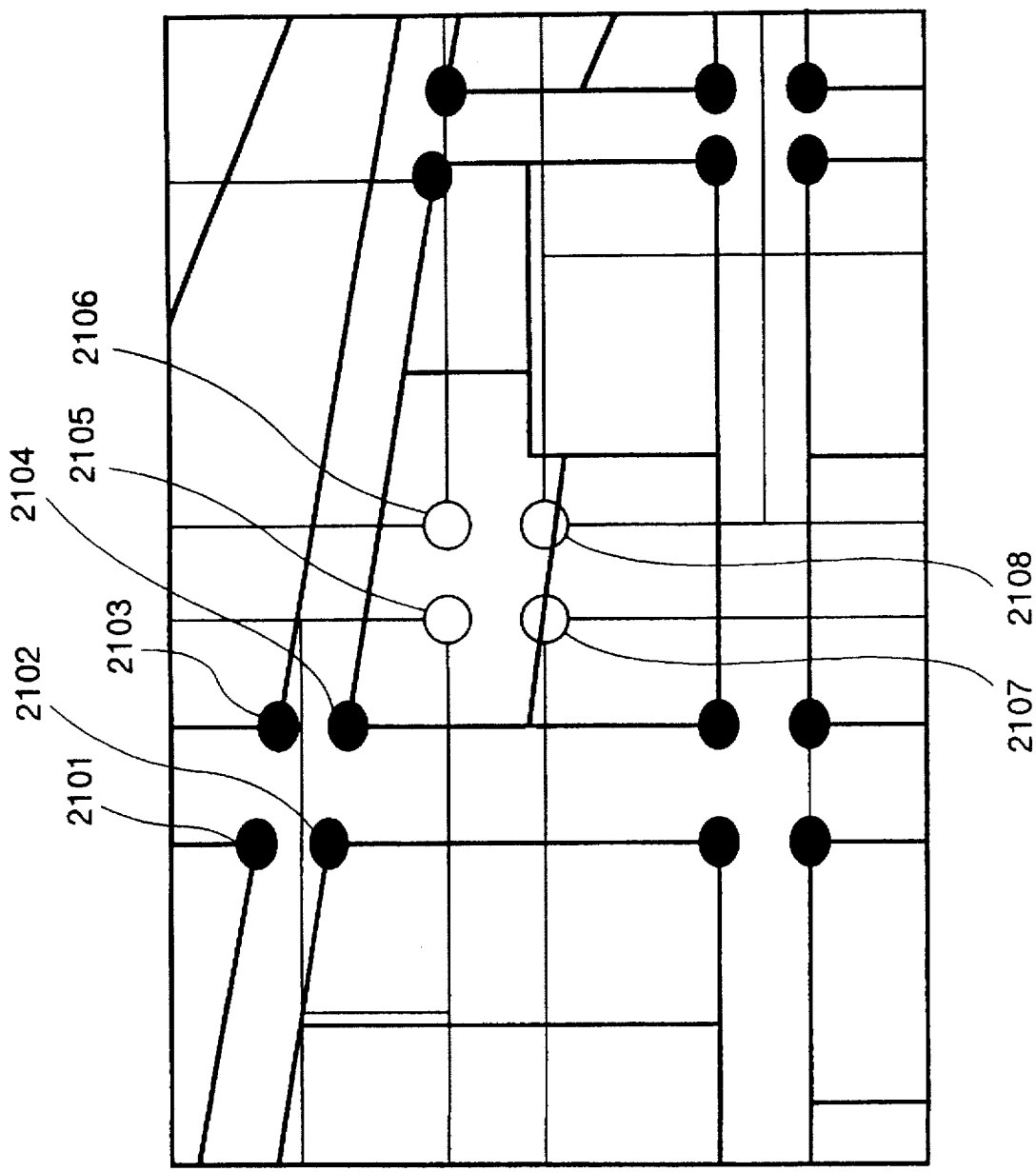
FIG. 21 is an enlarged view of an image information portion subjected to positioning.

In FIGS. 20A and 20B and FIG. 21, the coordinates 732 and 733 of correspondent points of first and second image information stored in the image-image link DB 730 are indicated by white and black dots, respectively. The transformation of the second image information will now be explained using FIG. 21.

There are selected three (for example, correspondent points 2105, 2106 and 2107) from among correspondent points of the first image information included in the lens area (hereinafter referred to as correspondent points on first image information), and the reference is made to the image-image link information DB 730 to determine correspondent points 2101, 2103 and 2102 of the second image information (hereinafter referred to as correspondent points on second image information) which correspond to the selected correspondent points. Such two sets of combinations of three points are selected and the second image information is modified in accordance with an algorithm which will be mentioned later on. A method of selecting correspondent points from the first image information includes a method in which a user designates the correspondent points through the input device 3 and a method in which those of correspondent points nearer to the centroid of the lens area are selected.

An example of an algorithm for transformation of overlaying image information will now be described. In the described transformation, a triangle formed by a set of three correspondent points on the second image information is transformed to coincide with a triangle formed by correspondent points on the first image information corresponding to the three points in the set. For example, in FIG. 21, a triangle formed by correspondent points 2101, 2103 and 2102 on the second image information is transformed to coincide with a triangle formed by correspondent points 2105, 2106 and 2107 on the first image information.

Figure 22:
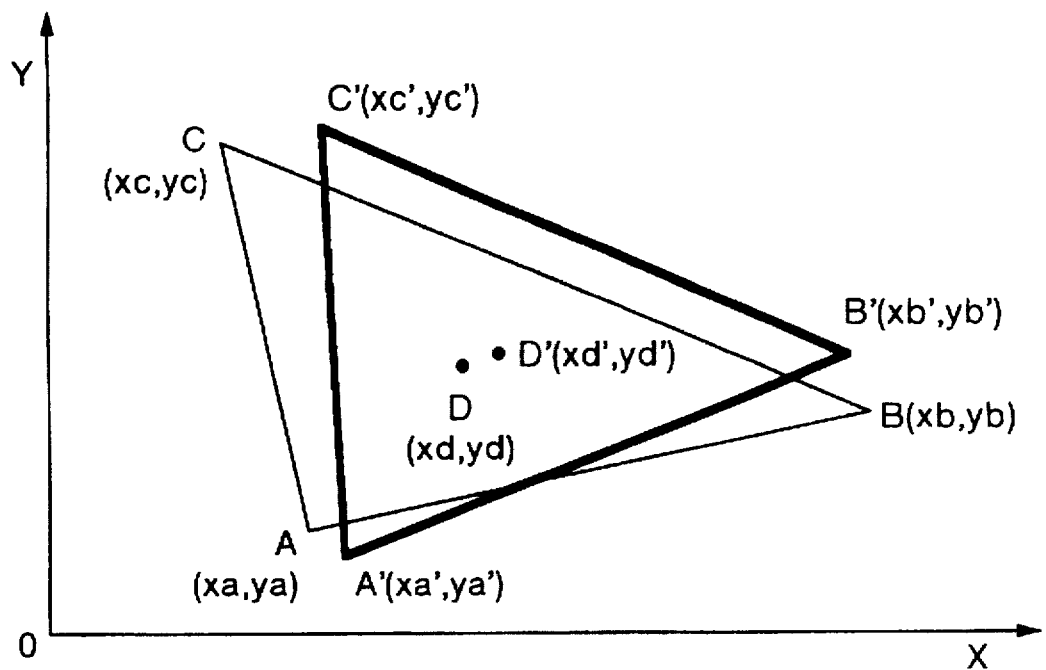
FIG. 22 is a diagram for explaining a modifying process for image positioning.

The computational expresssion for the transformation will now be shown. As shown in FIG. 22, it is assumed that correspondent points on the first image information are A(Xa, Ya), B(Xb, Yb) and C(Xc, Yc) and correspondent points on the second image information are A'(Xa', Ya'), B'(Xb', Yb') and C'(Xc', Yc'). At this time, the correspondent points A', B' and C' on the second image information are corrected to coincide with the correspondent points A, B and C on the first image information. As a result, any point D'(Xd', Yd') included in the triangle A'B'C' formed by the correspondent points on the second image information is corrected to turn into a point D(Xd, Yd) calculated by the following equations:

$$Xd = T(Xb-Xa)+S(Xc-Xa),$$

$$Yd = T(Yb-Ya)+S(Yc-Ya) \qquad (1)$$

where $$T = (s2 \cdot Xd' - s1 \cdot Yd')/(t1 \cdot s2 - t2 \cdot s1)$$

$$S = (t2 \cdot Xd' - t1 \cdot Yd')/(t2 \cdot s1 - t1 \cdot s2)$$

$$t1 = Xb' - Xa'$$

$$t2 = Xc' - Xa'$$

$$s1 = Yb' - Ya'$$

$$s2 = Yc' - Ya'.$$

Besides the above method, the conventional two-dimensional graphic transformation method can be used. With the use of the above-mentioned transforming process, the following effects are obtained.

(1) Since a mismatching between two image information is reduced, useless information in the overlaying areas is reduced, thereby reducing a user's misperception.

(2) Since a correspondence between two image information is visually represented, the user can make a rapid judgement based thereon.

Figure 13:
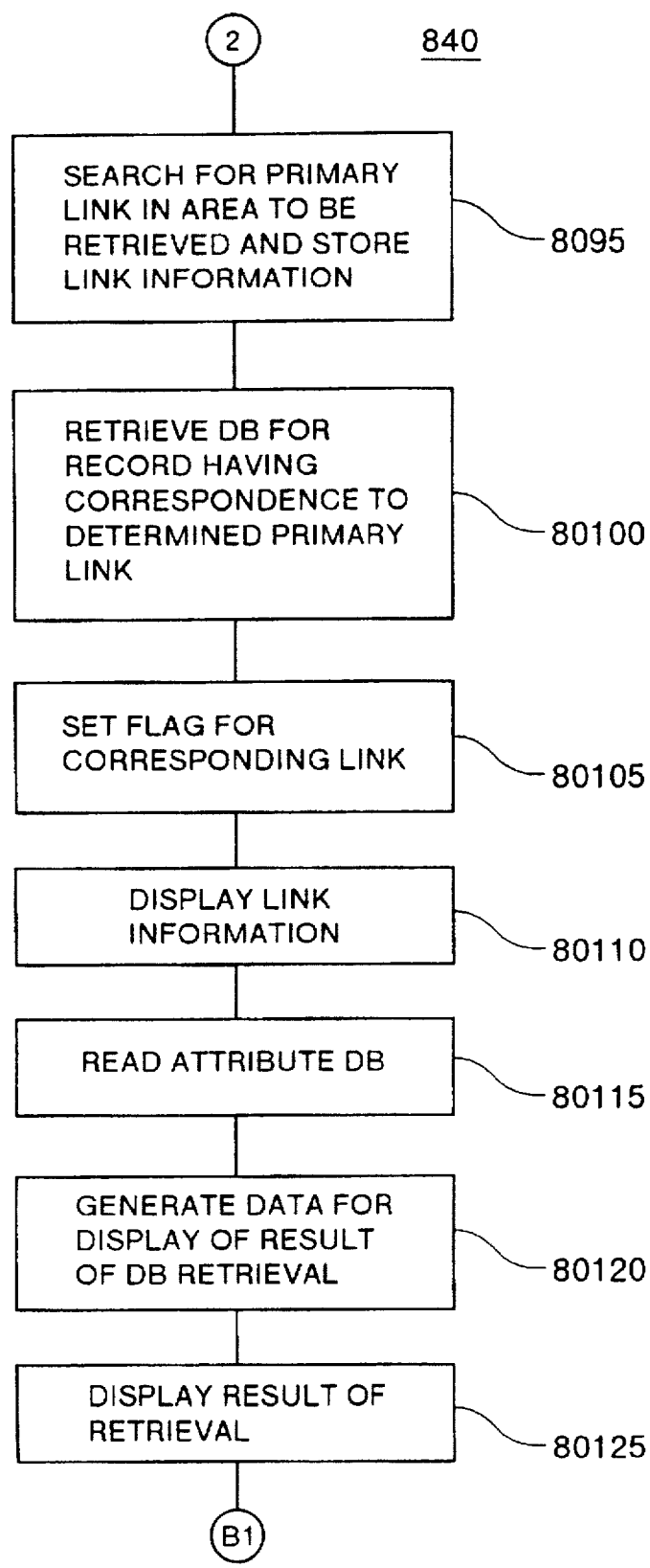
FIG. 13 is a flow chart showing a DB retrieval process.

Finally, the DB retrieval process 840 will be explained using FIG. 13.

Figure 11:
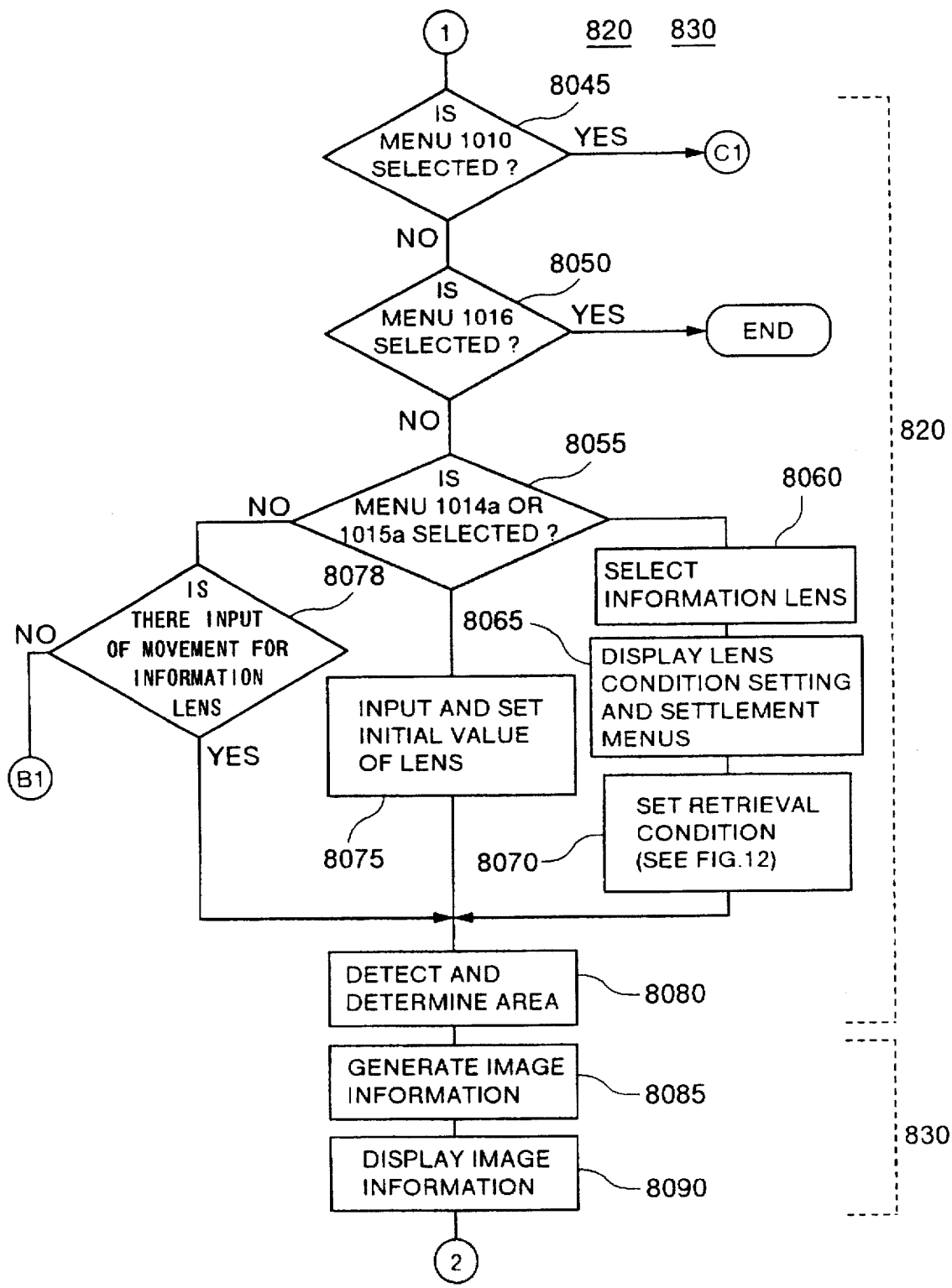
FIG. 11 is a flow chart showing a parameter setting process and an image information generating process.

In the DB retrieval process 840, a search for primary link information included in a focus area determined in step 8080 shown in FIG. 11 is made using the link information DB 300 and the searched-out primary link information is stored into the hit link table 700 (step 8095). The focus area is an area corresponding to first image information or second image information set in step 8065 or 8075 shown in FIG. 11.

The DB retrieval is made for the primary link information determined in step 8095 on the basis of the attribute information DB.'s 100 and 110 and a DB retrieval condition stored in the table 620a (step 80100). In the present embodiment, the DB retrieval is made after the retrieval of an area. However, in the case where the number of primary link information is great, the abstraction of primary link information may be made after the DB retrieval.

As the result of DB retrieval, a flag is set into the column 705 of the table 700 for the corresponding primary link information (step 80105) and the primary link information having a set flag in the column 705 is displayed (step 80110). Marks 1061a to 1067a shown in FIG. 18 are link information concerning the primary link having a set flag in the column 705.

Information of the attribute information DB concerning the primary link information having a set flag in the column 705 is read referring to the columns 701 and 702 (step 80115). Referring to the display style 610a of the table 600a and the flag 626a of the table 620a indicating whether or not the result of DB retrieval should be displayed, data for display of the result of DB retrieval is generated from the read DB information (step 80120). The generated data is displayed on the display device 5 (step 80125).

Figure 12:
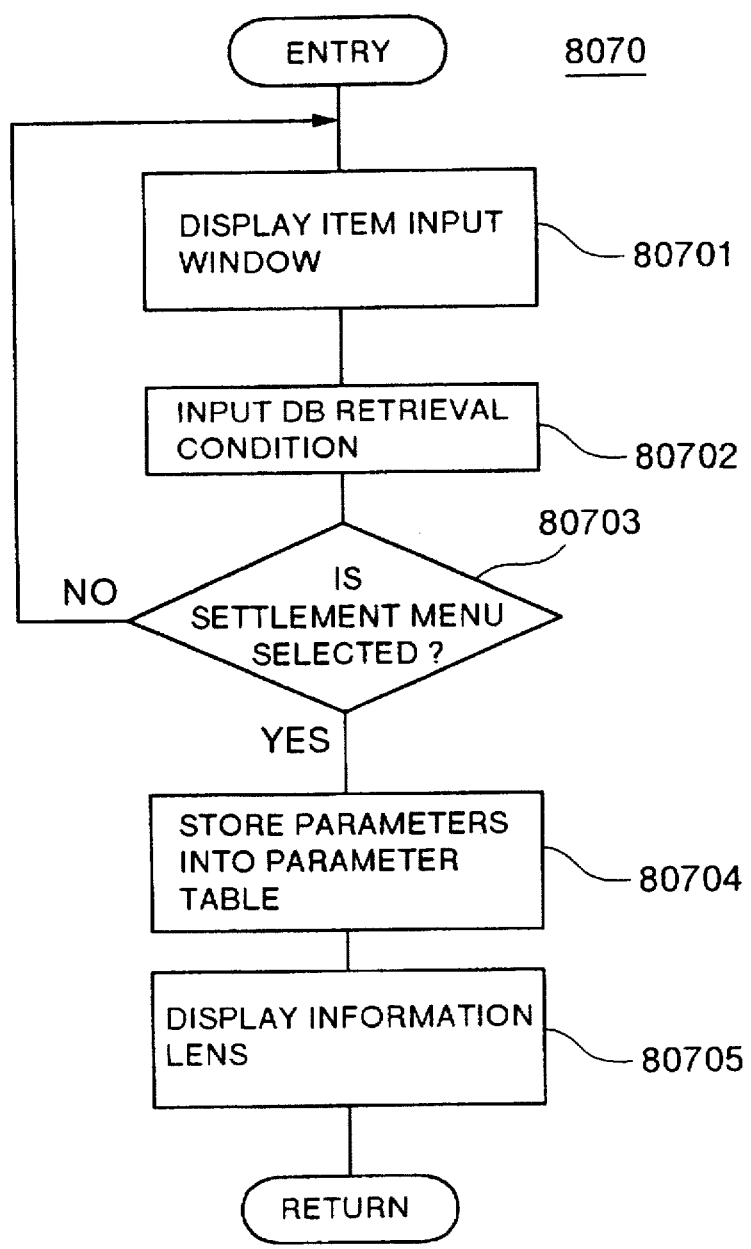
FIG. 12 is a flow chart showing a retrieval condition setting process.

A displayed example of the result of DB retrieval is shown in FIG. 18. The result of DB retrieval is displayed in an area 1081. As shown in FIG. 18, values set in step 80702 of FIG. 12 are such that a full name and an address are displayed as the result of DB retrieval and the display style is a style of displaying a display area in a card form for the corresponding primary link information. As another display style, a method in which the result of DB retrieval is displayed in one table may be used. In this case, the area 1041 shown in FIG. 17B is selected. The area 1081 for displaying the result of retrieval is set at the periphery of the lens area 1033a so that individual results of retrieval do not overlap, and the display is made so that a connection with the corresponding marks 1061a to 1067a is recognizable.

Also, the result of retrieval and relevant information such as image information as shown in FIG. 18 are stored into the work file 2a. Namely, each information stored in the external memory 2 is selectively stored into the work file 2a through the above-mentioned qualitative retrieval and is then used in the quantitative retrieval with function sheet which will be mentioned later on.

In the present invention, the correspondence of the result of DB retrieval to a position on a map corresponding thereto is displayed, as mentioned above. Therefore, even if information for an individual portion is displayed, there is no fear that a user may lose sight of the correspondence.

The quantitative retrieval 900 with the function sheet shown in FIG. 1 is composed of the DB information reading process 910 and the quantitative retrieval process 920. In the quantitative retrieval 900 which will be mentioned in the following, the work file 2a generated in the qualitative retrieval 800 is used. The contents of the work file 2a are substantially the same as the contents stored in the external memory 2. Therefore, the same reference numerals as those used in conjunction with the external memory 2 will be used.

In the process 910, a data format of DB retrieval condition is generated as a DB retrieval format table 500b on the basis of the attribute information DB's 100 and 110 in which attribute information is stored. The process 910 further includes reading, from the work file 2a, the image information DB 200 in which image information is stored and the link information DB 300 in which link information for linking the image information and the attribute information DB with each other is stored. The read DB information is displayed on the display device 5.

The process 920 includes a function sheet generating instruction detecting process 921, a retrieval condition changing instruction detecting process 922, a function sheet generating/changing process 923 and a DB retrieval process 914. A function sheet in the present invention is the composition of image data designating an area to be retrieved for image information and a retrieval condition represented by text information. Namely, the text information included in the function sheet qualitatively sets a retrieval condition, and the image data included therein directly sets an area of application of the retrieval condition on image information which is an object of retrieval. The image data includes image data which is used for only the designation of an area to be retrieved and image data in which a retrieval condition represented by text information is converted into an image and is displayed in a composite form.

The retrieval condition represented by text information includes a locational requirement, a DB requirement and a combinative requirement. The locational requirement is text information concerning an area to be retrieved which is inputted by operating image data. The DB requirement is text information concerning a retrieval condition which is used in making the DB retrieval. The combinative requirement is text information which, when the retrieval is made using a plurality of function sheets, indicates in what relation a locational requirement and a DB requirement possessed by a certain function sheet should be retrieved with a locational requirement and a DB requirement possessed by which of function sheets. The locational requirement may be inputted directly by text information from the input device 3.

Thus, a positional retrieval condition can be inputted by operating image data displayed on the display device 5. Therefore, it is possible to input an area to be retrieved without referring to text information representative of the position of image data being displayed, thereby facilitating the input of the positional retrieval condition.

In the process 920, the contents of a function sheet generating instruction or a retrieval condition changing instruction, when the instruction is inputted, are detected by the process 921 and the process 922 and the process 923 is performed. In the process 923, initial values concerning a function sheet are inputted by an input from the input device 3 by a user, the reference to the table 500b and the setting of a beforehand prepared value or the preceding used value, and a function sheet parameter table 600b is generated by use of the inputted initial values. And, image data of the function sheet is generated on the basis of the table 600b and is displayed in a composite form with image information to be subjected to retrieval. A locational requirement is inputted by operating the image data of the function sheet and is stored into the table 600b.

Thus, the preceding set value can be set as an initial value in the generation of a function sheet. Therefore, in the case where a part of a retrieval condition is to be changed, a condition setting time can be shortened. As a result, a retrieval time is shortened so that an effective retrieval is made.

In the process 924, the DB retrieval is made on the basis of the table 600b generated in the process 923 and with reference to the DB 100, the DB 110, the DB 200 and the DB 300. Further, the result of retrieval is stored into the hit link table 700 and the image data of the function sheet and the result of retrieval are displayed.

Figure 24:
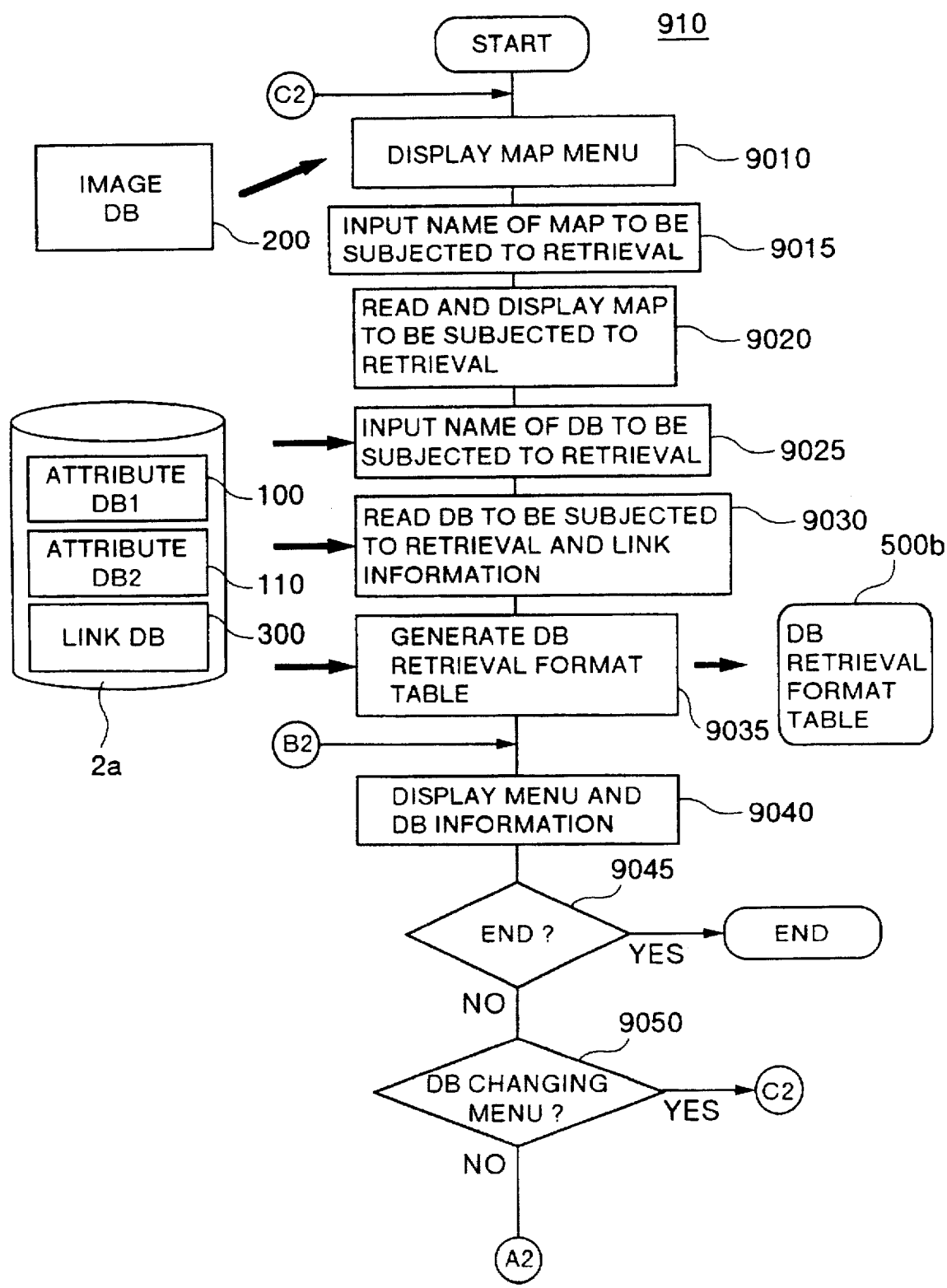
FIG. 24 is a flow chart of a DB information reading process.
Figure 25:
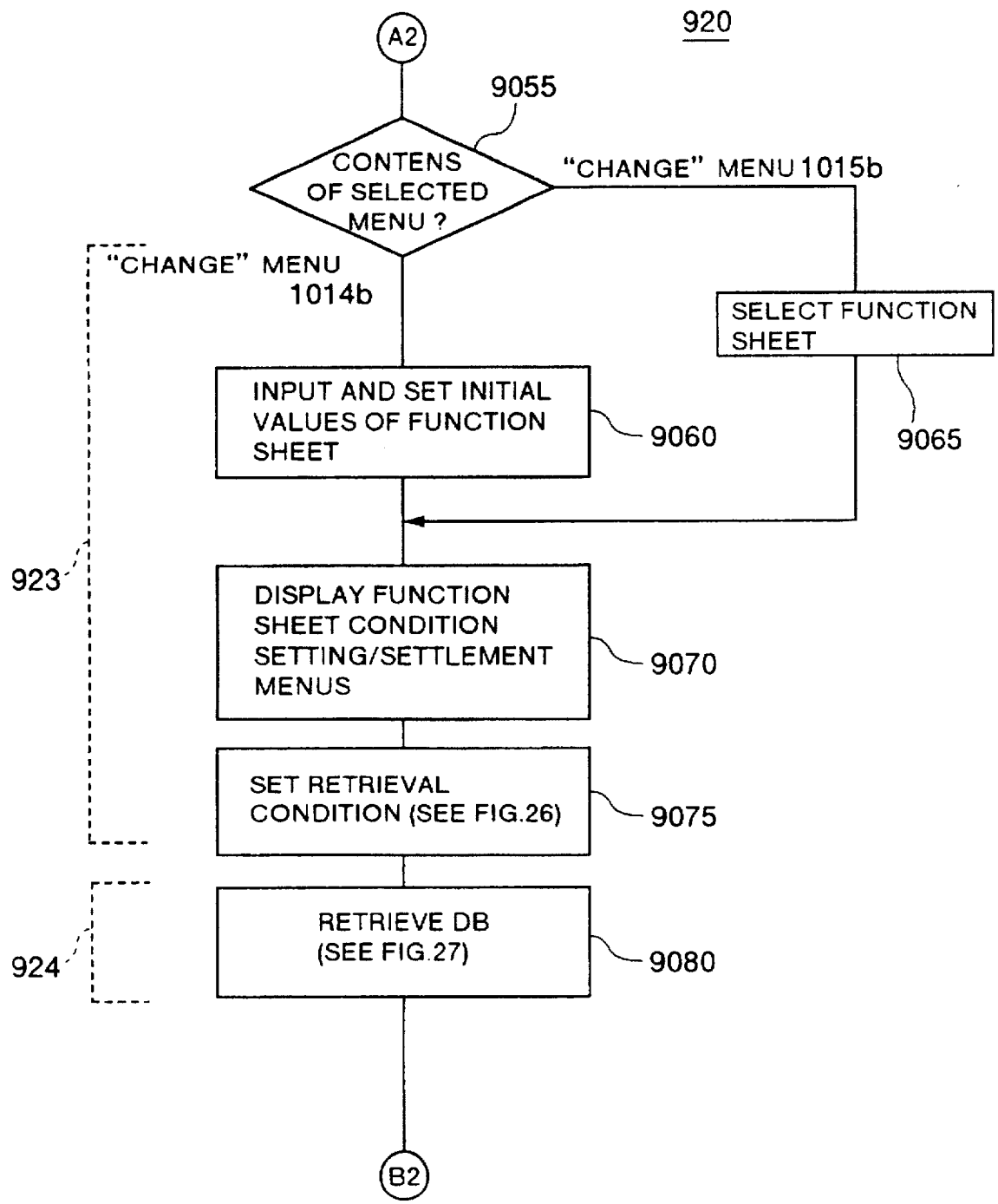
FIG. 25 is a flow chart of a retrieval process.
Figure 26:
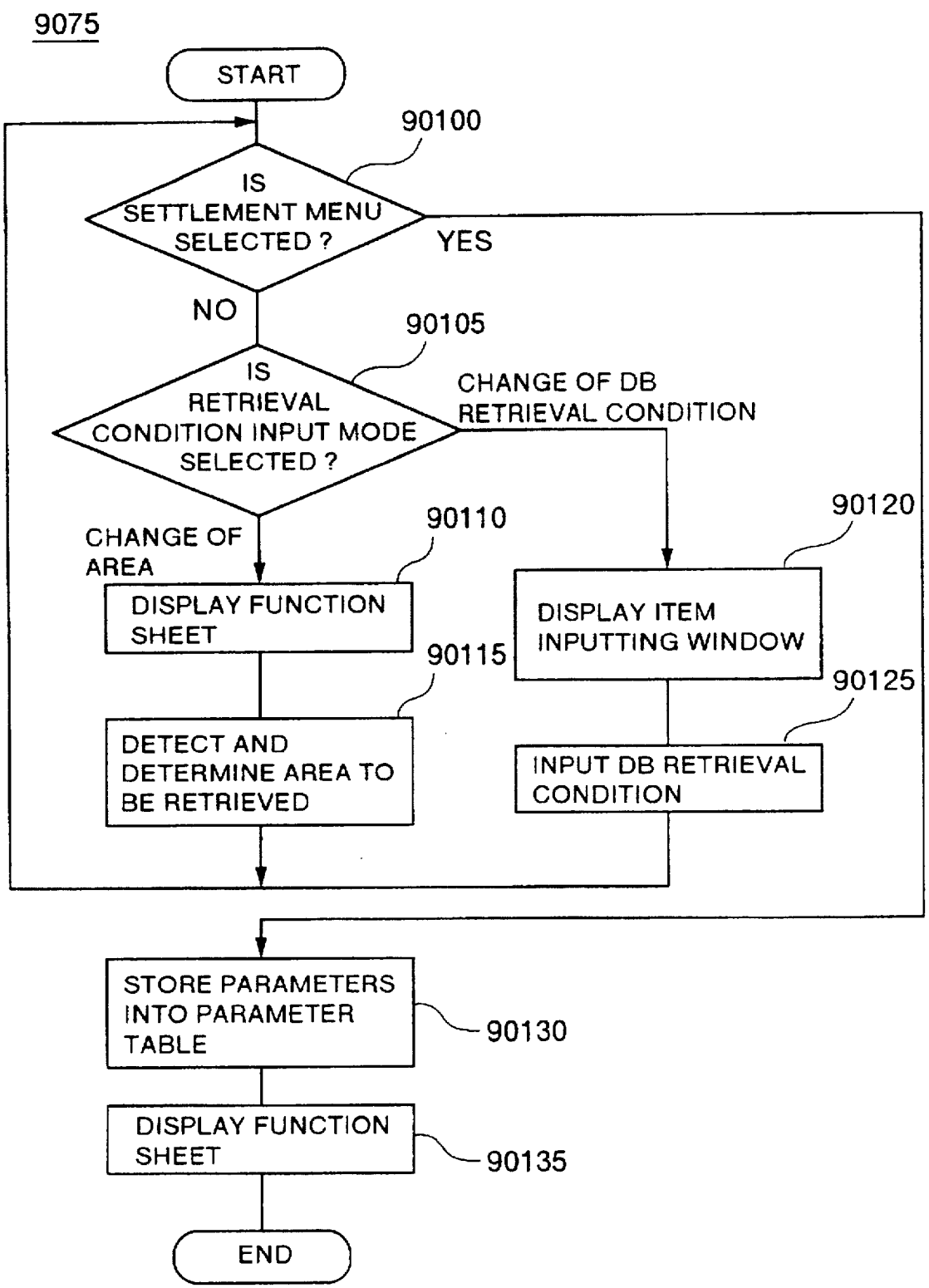
FIG. 26 is a flow chart for the setting of a retrieval condition.
Figure 27:
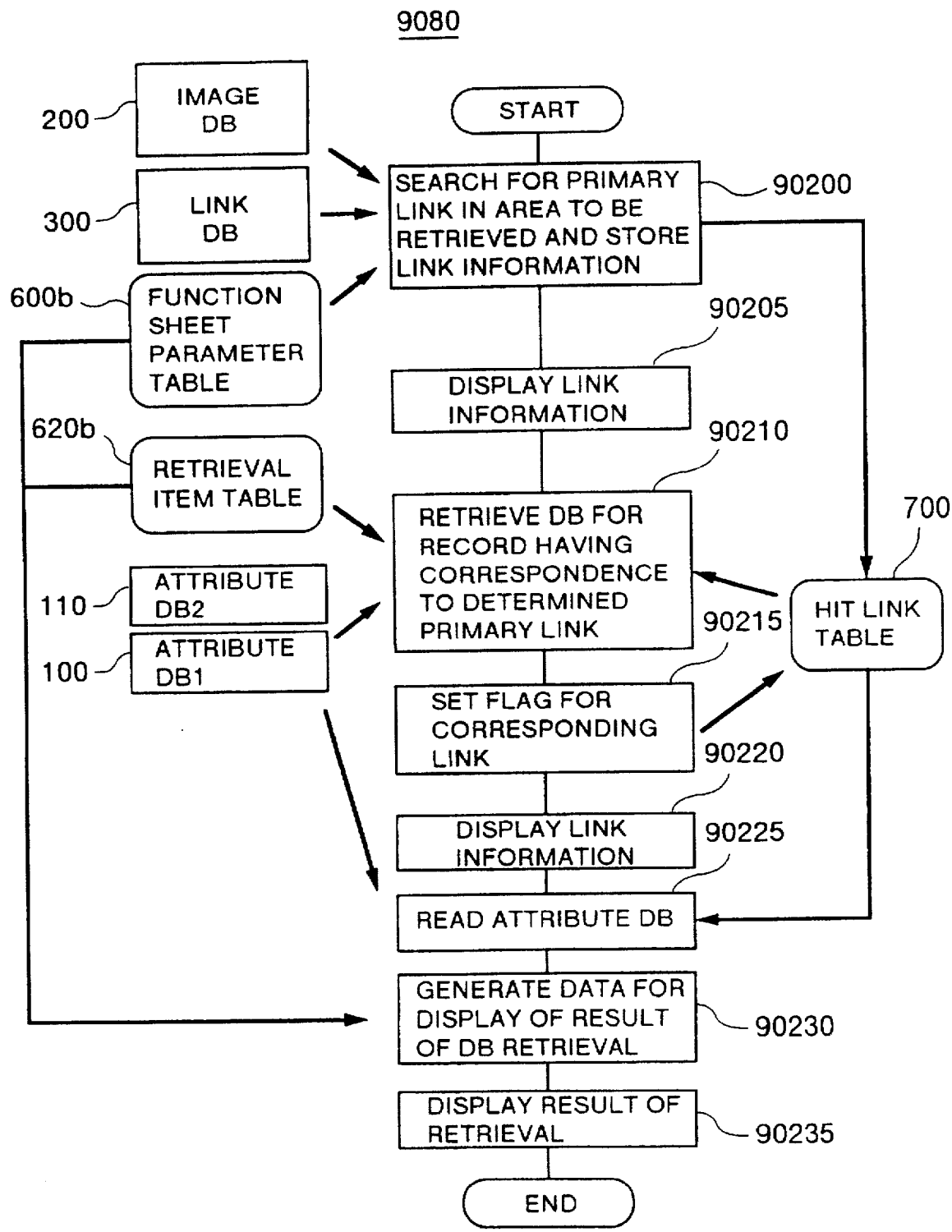
FIG. 27 is a flow chart of a DB retrieval process.

The correspondence of the process 910, the process 920 and processes 921 to 924 to flow charts shown in FIGS. 24 to 27 is as follows. Namely, FIGS. 24 and 25 show the flow of the overall processing of the qualitative retrieval 900 as a whole. The details of the process 910 are shown in FIG. 24 and the details of the process 920 are shown in FIG. 25. The processes 921 and 922 included in the process 920 correspond to step 9055 shown in FIG. 25, the process 923 corresponds to steps 9060 to 9075, and the process 924 corresponds to step 9080. Further, the details of step 9075 of FIG. 25 are shown in FIG. 26 and the details of the process 924 are shown in FIG. 27.

Figure 23:
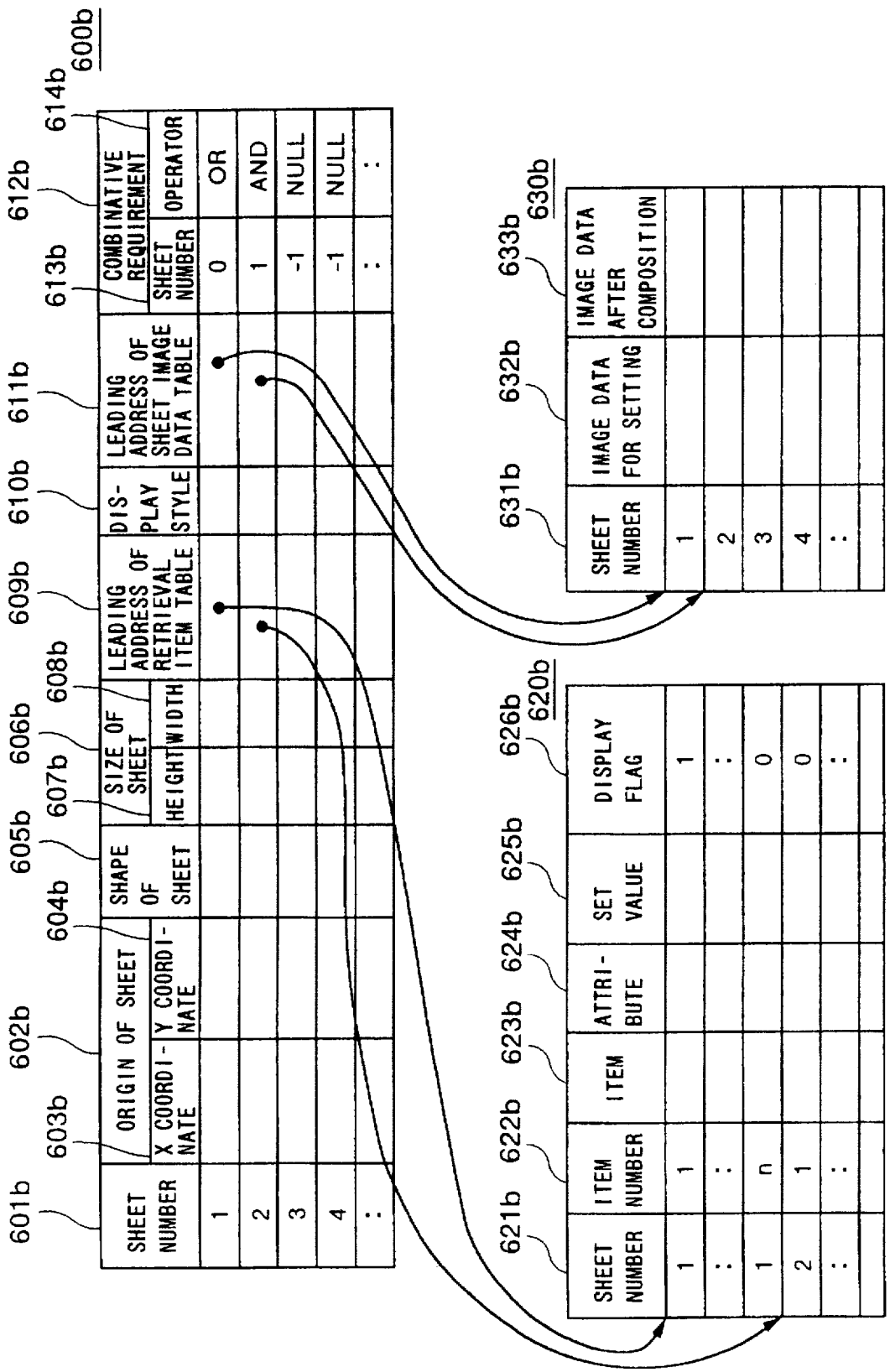
FIG. 23 is a diagram showing the structure of a function sheet parameter table in which retrieval conditions are stored.

FIG. 23 shows the structure of the function sheet parameter table 600b.

The table 600b shown in FIG. 23 includes the columns of sheet number 601b peculiar to a function sheet, origin of the function sheet (reference point of the function sheet area) 602b, shape of sheet 605b, size of sheet 606b, leading address 609b of a retrieval item table 620b in which retrieval items are stored, display style 610b of the result of retrieval, leading address 611b of a sheet image data table 630b in which image data of the function sheet is stored, and combinative requirement 612b representing the relation of a DB requirement possessed by each function sheet. The column of origin of sheet 602b is composed of the columns of X and Y coordinates 603b and 604b of the origin. The column of size of sheet 606b is composed of, for example, columns representing the lengths of height 607b and width 608b respectively. The column of combinative requirement 612b shows a pointer (or partner in operation) and is composed of a sheet number column 613b in which the sheet number of a function sheet for linking retrieval conditions is stored and an operator column 614b in which an operator for those conditions is stored. A retrieval condition represented by characters and an area indicating an area of application of the retrieval condition are generated as image data of the function sheet on the basis of the parameters set in the table 600b and the generated image data is displayed on the original image information.

In the present embodiment, examples of the shape of a function sheet include rectangle, circle and polygon. However, a region enclosed by a free curve or a specified shape beforehand registered may be used in accordance with image information to be subjected to retrieval. For example, in the case where a map is used as image information, a figure can be used which represents administrative districts or an area along a certain road. Since the shape of the sheet can thus be changed in accordance with the object of retrieval, analysis adapted for the property of an area becomes possible.

The table 620b includes the columns of sheet number 621b, item number 622b, item 623b, attribute 624b, set value 625*b* and display flag 626*b* of the result of retrieval. The table 630*b* includes the columns of sheet number 631*b*, image data 632*b* for setting, and image data 633*b* after composition with retrieval condition.

A quantitative retrieval with a function sheet will be explained in the following procedure.

First, the process 910 shown in FIG. 1 will be explained using FIG. 24 in reference to a displayed example shown in FIG. 28. Next, the quantitative retrieval process 920 will be explained using FIG. 25 in reference to displayed examples shown in FIGS. 29 and 30. Further, the function sheet generating/changing process 923 will be explained using FIG. 26 in reference to displayed examples shown in FIGS. 30 and 31. The DB retrieval process 924 will be explained using FIG. 27 and displayed examples of the result of retrieval will be shown in FIGS. 32, 33 and 34. Finally, the result of retrieval, in the case where a plurality of function sheets are used, will be explained referring to a displayed example shown in FIG. 35.

FIG. 24 shows a flow chart of the DB information reading process 910. Since steps 9010 to 9035 shown in FIG. 24 are similar to steps 8010 to 8035 shown in FIG. 10 except that necessary information such as image data and attribute information DB is read from the work file 2*a*, the explanation thereof will be omitted. In step 9040, a menu for retrieval and read DB information are displayed as in step 8040 shown in FIG. 10. However, the display screen in this case has some difference from that shown in FIG. 14. As shown in FIG. 28, a menu 1013 for retrieval with function sheet includes an area 1014*b* for indicating the generation of a function sheet, an area 1015*b* for indicating the change of a retrieval condition, and an area 1016 for indicating the end of the system. The remaining is similar to FIG. 14.

Figure 28:
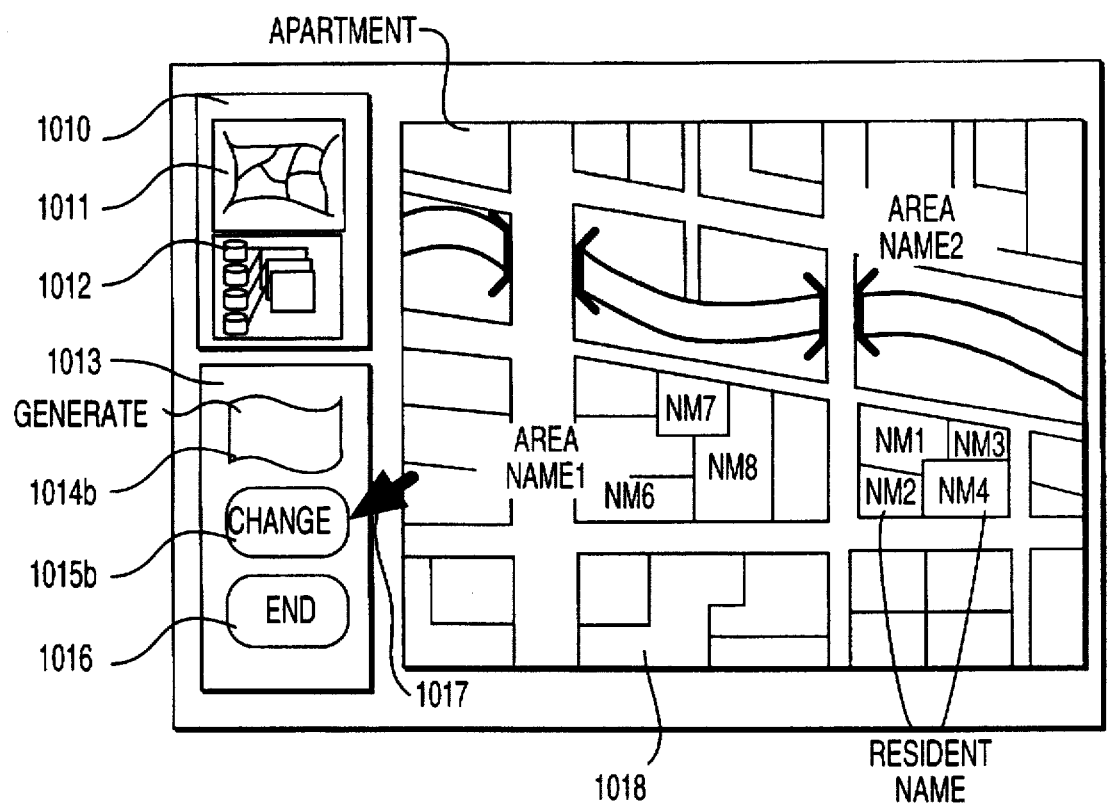
FIG. 28 is a displayed example of a menu screen.

After the menu and the DB information as shown in FIG. 28 have been displayed, there occurs a waiting condition until there is an input from the user, and the judgement is made as to whether or not the "END" button 1016 is selected (step 9045). In the case where the "END" button is selected, the processing is completed. In the case where the "END" button is not selected, the judgement is made as to whether or not a menu 1010 for changing a DB to be subjected to retrieval is selected (step 9050). In the case where the menu 1010 is selected, the flow returns to step 9010. In the case where the menu 1010 is not selected, the quantitative retrieval process 920 shown in FIG. 25 is performed.

FIG. 25 is a flow chart of the quantitative retrieval process 920.

First or subsequent to step 9050 shown in FIG. 24, the contents of a selected menu are judged (step 9055). In the case where the selected menu is "GENERATE" 1014*b*, step 9060 is performed. In the case where the selected menu is "CHANGE" 1015*b*, step 9065 is performed. A function sheet generating process will first be explained and a retrieval condition changing process will thereafter be explained.

Figure 29:
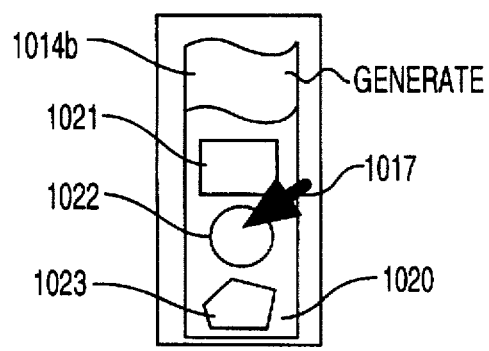
FIG. 29 is an example of a menu for inputting initial values of an area to be retrieved.

In the case where a function sheet is to be generated, preset values or values inputted from the input device 3 are set as initial values of the function sheet into the table 600*b* shown in FIG. 23. As the initial values of the function sheet are set values which are capable of being displayed in an area 1018 shown in FIG. 28. As a result, the size of displayed image data for setting can be prevented from being too large or too small for the area 1018 to display an object of retrieval. Therefore, no need to change a display magnification of the object of retrieval is required until an area to be retrieved is settled. When the menu 1014*b* is selected in step 9055, function sheet parameter tables 600*b* and 620*b* are generated so that a sheet number is set into the column 601*b* of the table. Further, a menu 1020 for designating the shape of the function sheet, as shown in FIG. 29, is displayed on the menu 1013. The displayed menu 1020 includes a plurality of areas for designating the shape of the function sheet. In FIG. 29, the menu for designating the shape of an area to be retrieved includes a rectangular area 1021, a circular area 1022 and a freely set area 1023.

One of the menus 1021 to 1023 is selected through the operation of a cursor 1017 by the user and is stored as a parameter representative of the shape into the column 605*b* of the table 600*b*. Beforehand prepared values are set into the columns 602*b*, 606*b* and 610*b*, and a leading address of the table 620*b* is set into the column 609*b*. Also, values are set into the columns 622*b* to 624*b* of the table 620*b* on the basis of the DB retrieval format table 500*b* (step 9060). A value corresponding to the subtraction of "1" from the sheet number of the column 601*b* is stored as a beforehand prepared value into the column 613*b* and an operator OR is stored into the column 614*b*. Then, the flow proceeds to step 9070. In the combinative requirement 612*b* shown in FIG. 23, "0" is set into the column 613*b* for storage of a sheet number of partner in operation since the leading sheet number 1 has no preceding sheet which serves as the pointer. And, "OR" is set as an operator into the column 614*b*. There results in "0.OR.1=1", that is, it is represented that the comparative requirement is the function sheet 1 itself. A function sheet 2 shows that a logical product (AND) with the sheet 1 is made. For function sheets 3, 4, etc., "−1" and "NULL" are set as a sheet number of the pointer and an operator, respectively, thereby representing that a comparative requirement is not yet set. In the case where several operations by using of sheets are defined, the sets of operations of sheets can be stored in the table 600*b* in such a manner that a delimiter (0 in FIG. 23) is set in the clumn 613*b* of a function sheet stored in the lead of each set of operations.

Figure 30A:
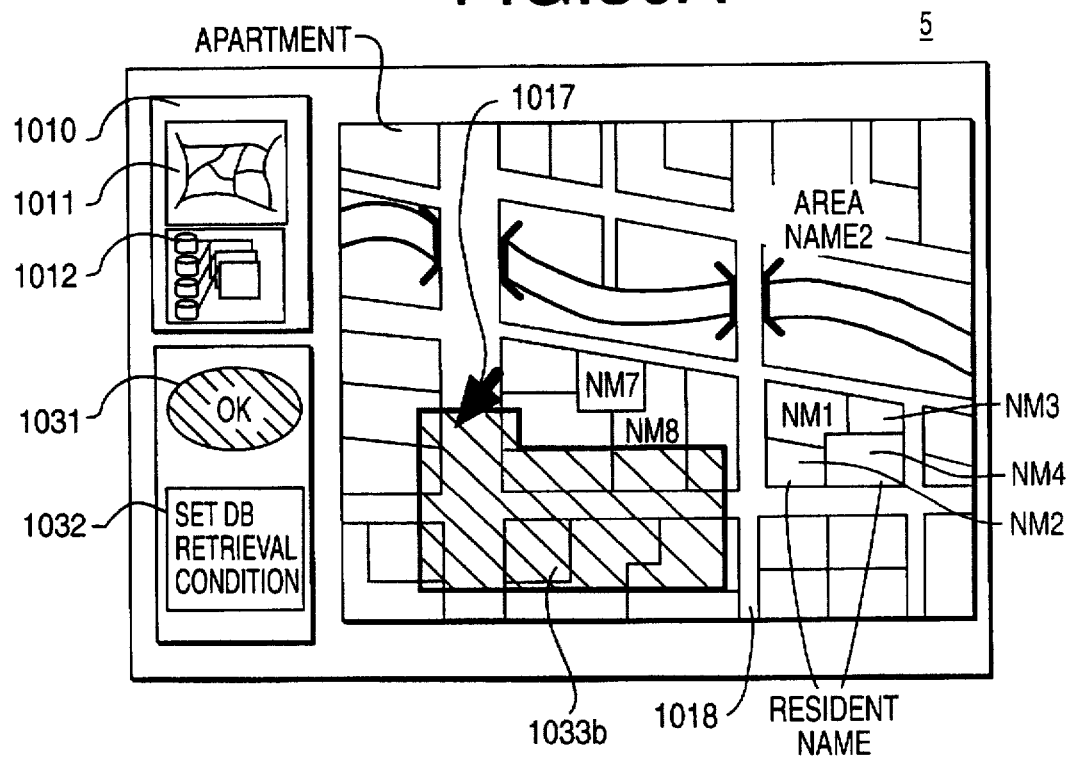
FIGS. 30A and 30B show a displayed example of a retrieval condition input screen.
Figure 30B:
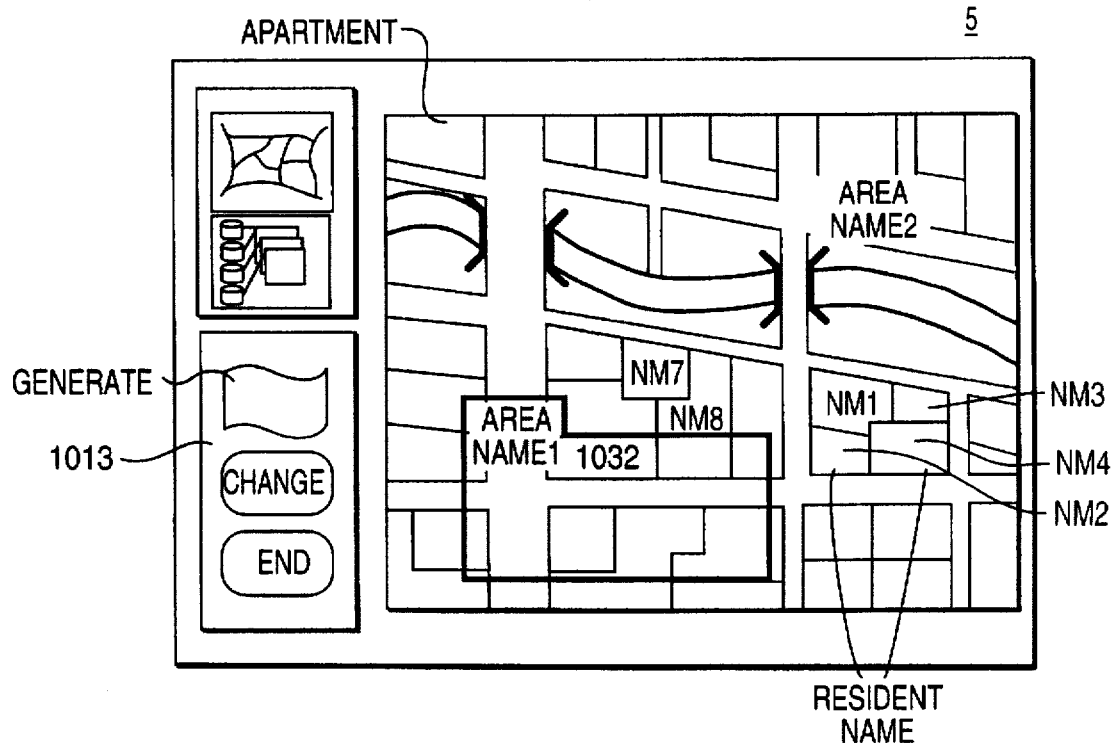

In step 9070, image data of the function sheet is generated referring to the function sheet parameter table 600*b* generated in step 9060, and the generated image data is displayed in a composite form with the image data of the object of retrieval displayed in the DB display area 1018, as shown in FIG. 30A. Further, as shown in FIG. 30A, a settlement menu 1031 and a menu 1032 for indicating the start of setting of a DB retrieval condition are displayed on the menu 1013. The image data of the function sheet used in step 9070 is image data displayed in inputting a locational requirement and is called image data for setting. On the other hand, there is image data used when the settled DB retrieval condition was composed on image information. This image data is called image data after composition.

What is important during the setting of a retrieval condition is to simply display which portion of the displayed image data of an object of retrieval an area to be retrieved corresponds to. What is important after the composition of an image is the contents of the image information in the area to be retrieved. Therefore, to use different image information as a function sheet in accordance with either the situation which is during the setting of the retrieval condition or the situation which is after the composition of the retrieval condition and the image, is effective for an operation of referring to image information.

In generating of the image data, each image data is entered into the function sheet data table 630*b* and a leading address of the table 630*b* is stored into the column 611*b* of the table 600*b*.

As mentioned above, when a retrieval condition concerning an area to be retrieved is inputted, image data representing the area to be retrieved is displayed together with image data of an object of retrieval. Therefore, the user can abstract an intended object easily while globally grasping a map of the object of retrieval.

On the other hand, in the case where the retrieval is to be changed, a mode of changing the retrieval condition is set and there occurs a waiting condition until a function sheet to be subjected to the change of the retrieval condition is selected. When the function sheet is selected through the operation of the cursor 1017 by the user (step 9065), step 9070 is performed. The details of step 9070 have already been mentioned.

Figure 34A:
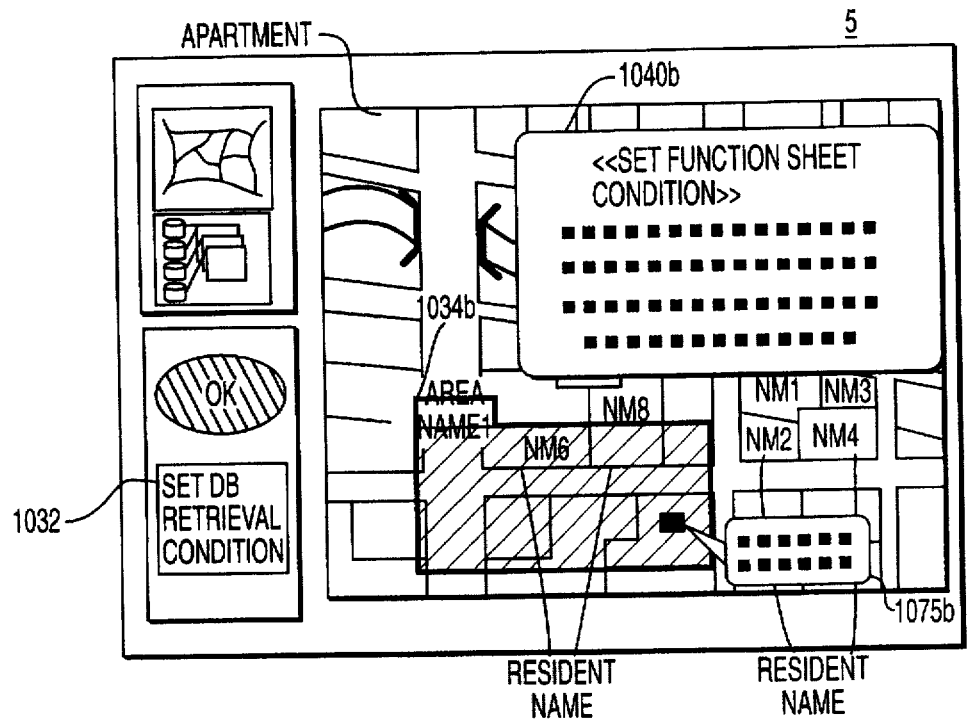
FIGS. 34A and 34B show a displayed example of the result of retrieval.
Figure 34B:
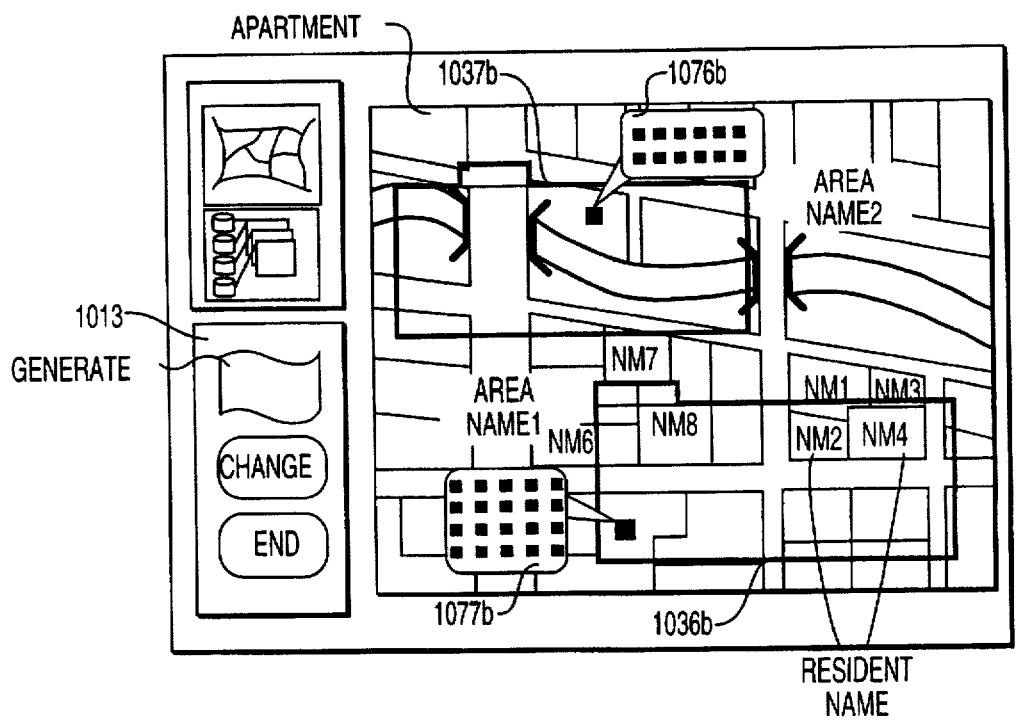

Next, a process for setting the retrieval condition is performed (step 9075) so that values are set into the parameter table 600b. Then, a DB retrieval process is performed (step 9080) and the flow returns to step 9040. According to the present invention, after the retrieval process has been performed, a retrieval process can be performed again in a state in which the result of retrieval is being displayed. Therefore, the next retrieval condition can be set while referring to the preceding result of retrieval or it is possible to easily make the retrieval in a trial-and-error manner. An example of the display screen at this time is shown in FIG. 34A. An area 1040b is a DB retrieval condition setting window and the result of DB retrieval is displayed in an area 1075b. According to the present invention, since another function sheet can be generated again after the retrieval condition has been set, it becomes possible to make an analysis based on a retrieval with a retrieval condition changed for each area. An example of the display screen at this time is shown in FIG. 34B. Image data representing a locational requirement is displayed in areas 1036b and 1037b, and the result of DB retrieval is displayed in areas 1076b and 1077b. The details of the areas 1037b, 1040b and 1075b to 1077b will be explained later on.

The details of the retrieval condition setting process 9075 are shown in FIG. 26.

In the retrieval condition setting process 9075, the judgement is made as to whether or not the retrieval condition settlement menu 1031 shown in FIG. 30A is selected (step 90100). In the case where the menu 1031 is selected, the already inputted parameters are stored into the table 600b and the DB retrieval condition setting window, if it is displayed, is erased (step 90130).

In the present embodiment, step 90130 is performed in accordance with an input for selecting the settlement menu 1031. However, step 90130 may be performed in accordance with the detection of, for example, the detachment of a finger from the button of a mouse or the detachment of a pen from a tablet. Further, step 90130 may be performed in accordance with an input for indicating the modification or movement of image data of a function sheet, that is, the change of an area to be retrieved.

The setting of parameters necessary for retrieval into the tables 600b and 620b and the resulting turn from the condition setting mode into the settlement mode are called the composition of a function sheet. Image data of the function sheet displayed on the display device 5 when the function sheet was composed is the above-mentioned image data after composition. A displayed example of the image data after composition is denoted by reference numeral 1035b in FIG. 30B.

In the case where it is determined as the result of judgement made in step 90100 that the settlement menu is not selected, either (1) the setting of a locational requirement or (2) the setting of a DB retrieval condition is judged. A method of starting each setting will now be explained using a displayed example of FIG. 30A in which image data of a function sheet for the setting is shown.

(1) The setting of locational requirement is started when a portion other than an area 1034b of an area 1033b, in which image data for setting is displayed, is selected by the cursor 1017. A method may also be used in which the setting of locational requirement is started in accordance with the detection of the detachment of a finger from the button of a mouse or the detachment of a pen from a tablet and the boundary of an area to be retrieved is set and displayed in accordance with the position of the cursor 1017 at that time and the position of the cursor 1017 when the mouse button was depressed. The setting of DB retrieval condition is started by selecting the area 1034b or the area 1032 on the menu 1013. Like the menu 1013, the area 1034b is an area for indicating the display of a DB retrieval condition setting window.

The provision of the menu for start of the setting of DB retrieval condition in image data for setting a locational requirement, as shown in FIG. 30A, reduces the amount of movement of the cursor, thereby facilitating the change-over of the setting of the retrieval condition. This is effective particularly in the case where the size of the display screen is large as compared with the amount of movement of the cursor per unit time.

When the user operates the image data for setting by use of the cursor 1017 after the start of the setting of locational requirement has been indicated, an image corresponding a function sheet subjected to change is displayed on the display device 5 each time the position or size of the image data is changed (step 90110). Thereafter, until the instruction for DB retrieval condition setting menu 1032 or the selection of the settlement menu 1031 is inputted, an area where the image data for setting is being displayed is detected and an area of the generated function sheet to be retrieved is determined (step 90115). Values (X, Y coordinates and size of the area of the generated function sheet) determined in step 90115 are stored into the columns 602b and 606b of the table 600b (step 90130).

Figure 31A:
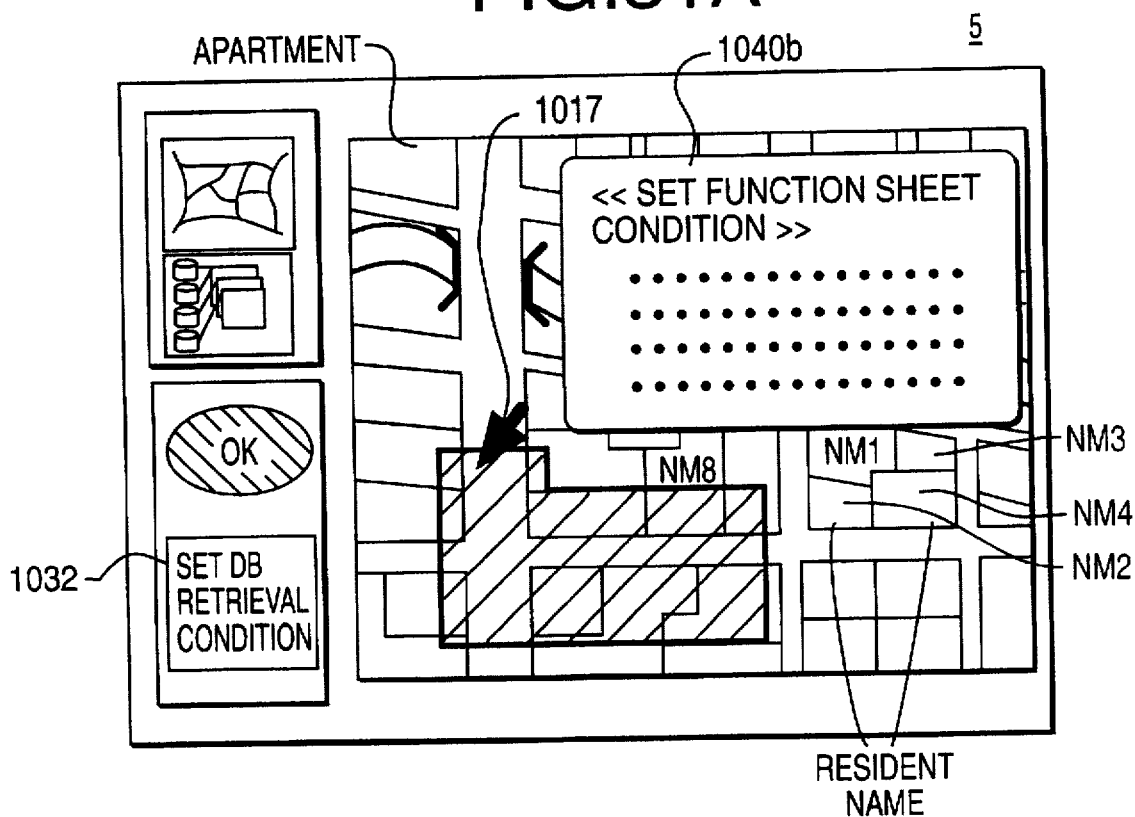
FIGS. 31A and 31B show a displayed example for the input of a DB retrieval condition.
Figure 32A:
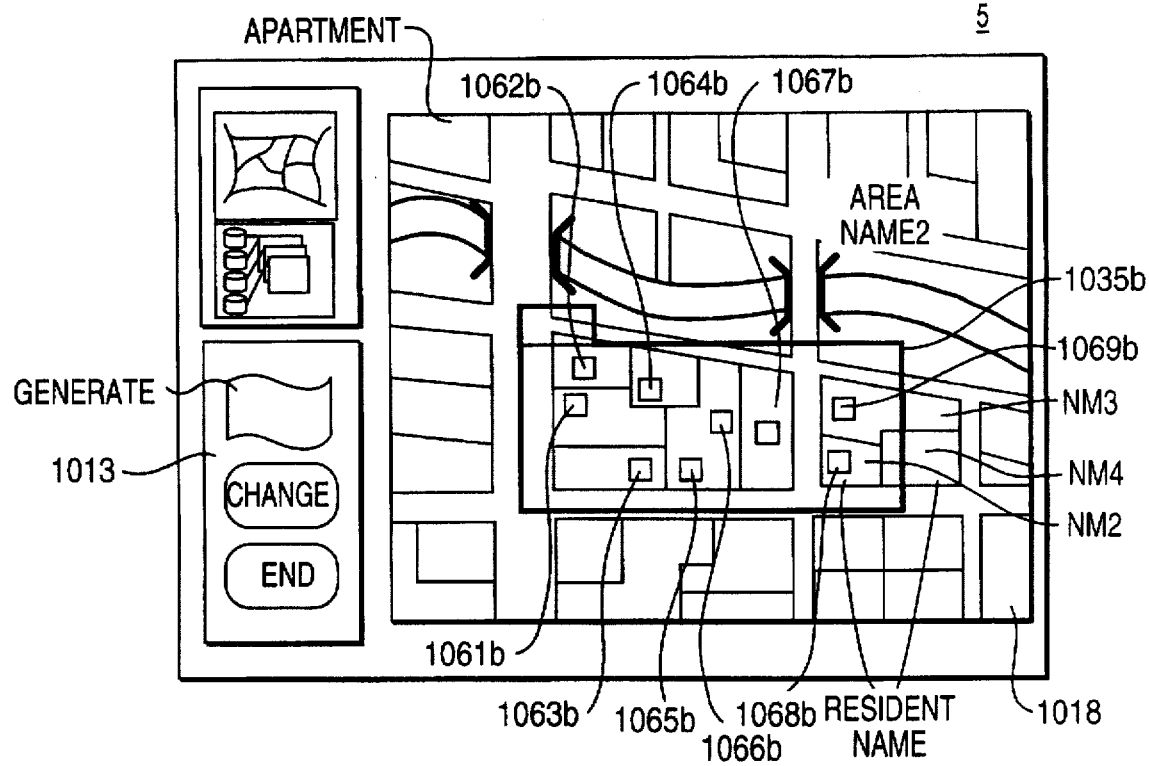
FIGS. 32A and 32B show a displayed example of the result of retrieval.

(2) When the start of the setting of DB retrieval condition is indicated, a DB retrieval condition setting window 1040b is displayed on the display device 5, as shown in FIG. 31A (step 90120). This window 1040b is generated referring to the table 620b. In step 90125, a display style, a set value for a retrieval item and an instruction for whether or not the result of retrieval for the retrieval item should be displayed are inputted into the window 1040b from the input device 3. Further, a comparative requirement 612b shown in FIG. 23 is inputted as a DB retrieval condition. A preset sheet number or a sheet number of function sheet designated by the user by use of the cursor 1017 is used as a pointer sheet number 613b. An operator 614b of sheets is set by an input from the keyboard or the selection from displayed menus. These values are stored into tables 600b and 620b in step 90130, as has already been mentioned. By setting a specified value beforehand defined as the pointer sheet number, a retrieval condition possessed by a certain function sheet is linked with a retrieval condition possessed by the preceding generated function sheet on the basis of an operator of sheets included in the certain function sheet and a retrieval process is performed. As a result, there is no need to set the pointer sheet number each time.

Figure 31B:
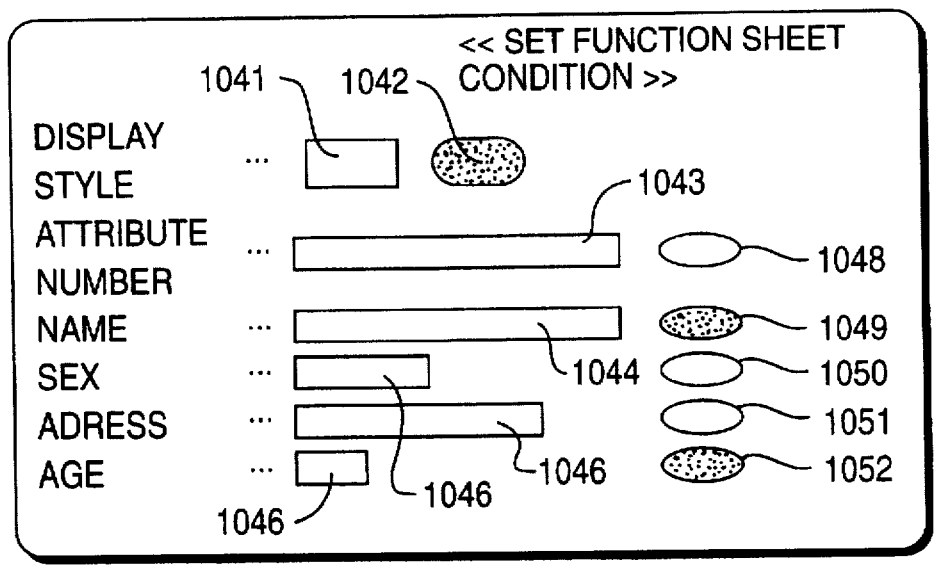

As mentioned above, since the user can make an instruction for setting of the locational requirement after the start of the setting of DB retrieval condition is indicated so that the window 1040b is displayed as shown in FIG. 31B, it is possible to freely select the order of setting a positional retrieval condition and a retrieval condition for DB retrieval.

Figure 33:
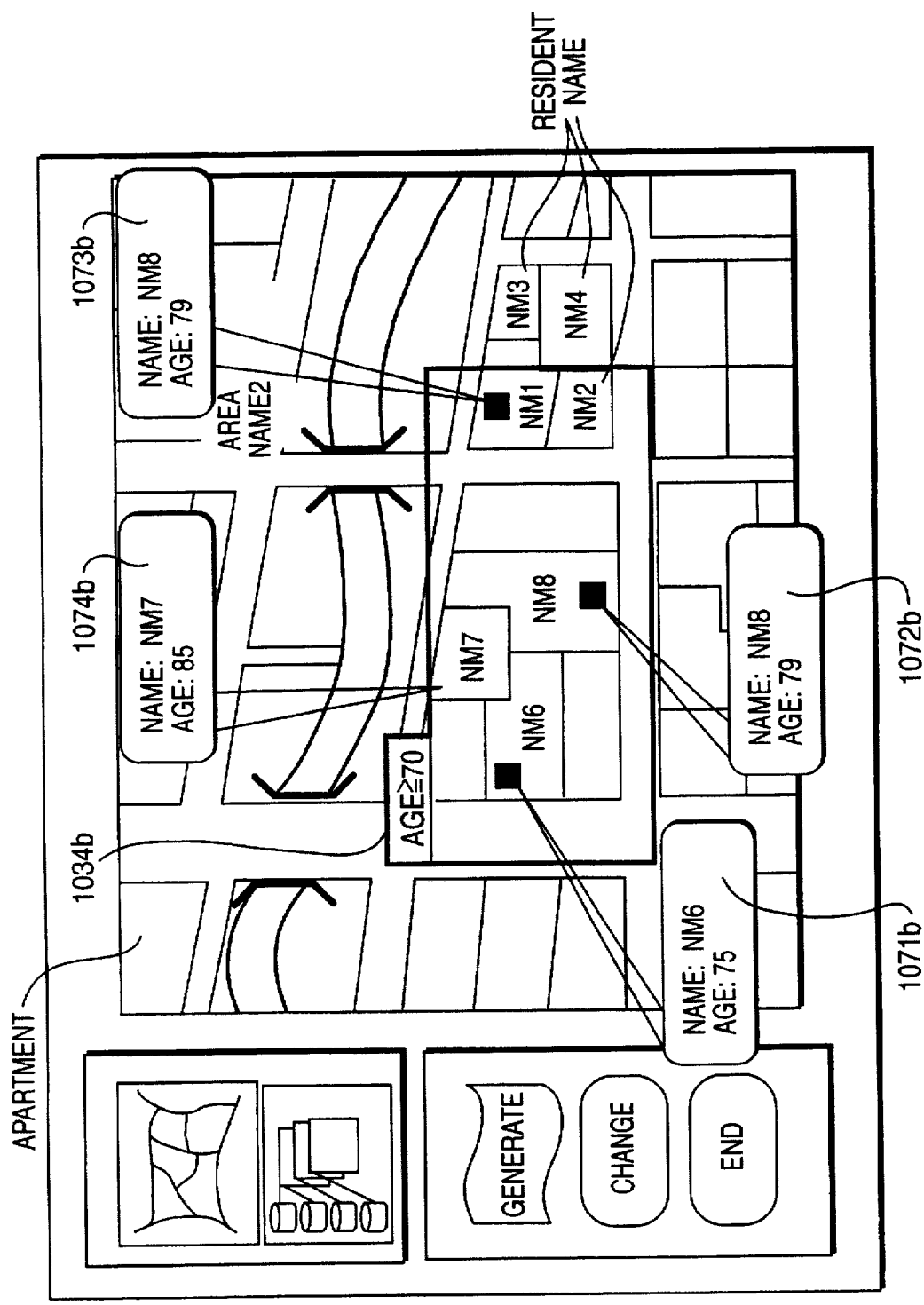
FIG. 33 shows a displayed example of the result of retrieval.

The window 1040b shown in FIG. 31B is composed of input areas 1041 and 1042 of display style, input areas 1043 to 1047 for set values for retrieval items, and areas 1048 to 1052 for setting whether or not the retrieval results for the retrieval items 1043 to 1047 should be displayed. For example, the result of retrieval, in the case where an instruction for DB retrieval of data showing the age of seventy or older than that is made for the area 1047, is shown in FIG. 33. The explanation of FIG. 33 will be made later on.

Next, the DB retrieval process 9080 will be explained using FIG. 27.

First, a search for primary link information included in the area to be retrieved determined in step 90115 shown in FIG. 26 is made using the link information DB 300 and the searched-out primary link information is stored into the hit link tables 700 and 710 shown in FIG. 8 (step 90200). In the case where a plurality of function sheets are generated, those ones of primary link information included in the link information DB 300, which has a correspondence to image information displayed in the area 1018, are stored into the tables 700 and 710. Each column of the sheet number 711 and the flag column 714 have "−1" set as an initial value. When data is stored into the table 700, "0" is set into each of the columns 711 and 714. On the basis of the determined link information, primary link information having a flag of "0" in the column 714 is displayed in the image information display area 1018 (step 90205). A displayed example of link information is shown by marks 1061b to 1069b in FIG. 32A.

At the same time, the DB retrieval is made for the primary link information determined in step 90200 on the basis of the attribute information DB's 100 and 110 and the DB retrieval condition stored in the retrieval item table 620b (step 90210). In the present embodiment, the DB retrieval is made after the retrieval of an area. However, in the case where the number of primary link information is great, the abstraction of primary link information may be made after the DB retrieval.

Figure 32B:
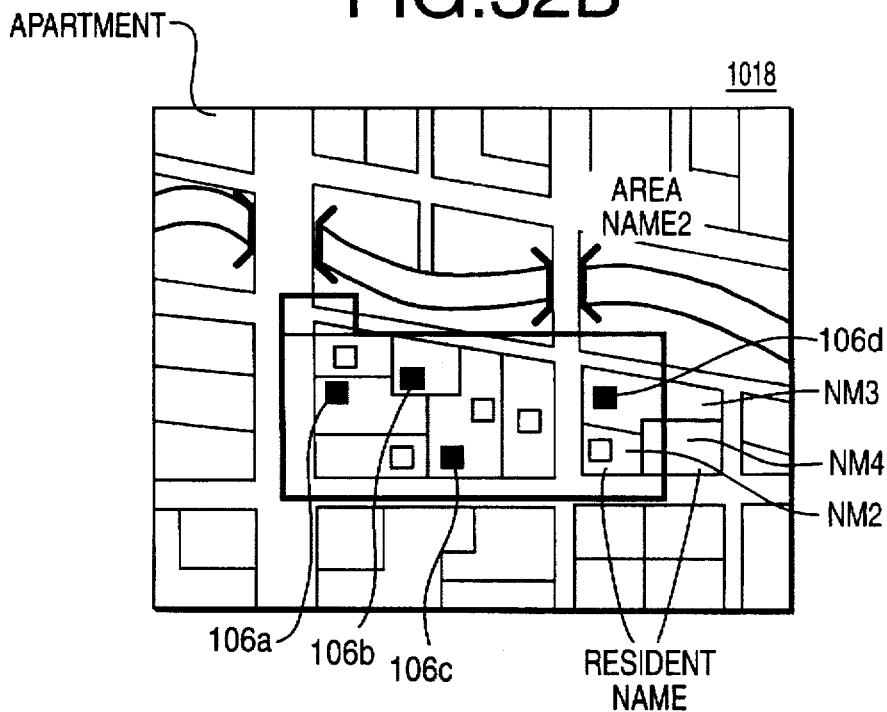

As the result of DB retrieval, "1" is set into the column 711 of the table 710 for the corresponding primary link information. Also, referring to the column 711 and the column 612 of the table 600, "1" is set into the column 714 for the corresponding record so that a flag is set (step 90215). Next, those ones of the primary link information displayed in step 90205 having a set flag of "1" in the column 714 are displayed as they are, and those ones thereof having a value other than "1" in the column 714 are not displayed (step 90220). Marks 106a, 106b, 106c and 106d shown in FIG. 32B are link information concerning the primary link having the set flag in the column 714. In FIG. 32B, the primary link information to be displayed in step 90205 and the primary link information to be displayed in step 90220 are displayed with different colors, thereby displaying different link information simultaneously on the same screen. However, the marks indicating the different link information may be displayed with different shapes or there may be used a method in which any link information is not displayed in step 9025 and only the primary link information obtained in step 90220 is displayed.

In the present invention, since primary link information included in an area to be retrieved and primary link information abstracted from the earlier-mentioned primary link information in accordance with a DB retrieval condition are displayed, it is possible to know to what extent the objects corresponding to a DB retrieval condition are included in objects on an image map linked with DB information. Further, the reference to the outline of the already obtained result of retrieval can be made in changing a retrieval condition.

Figure 35A:
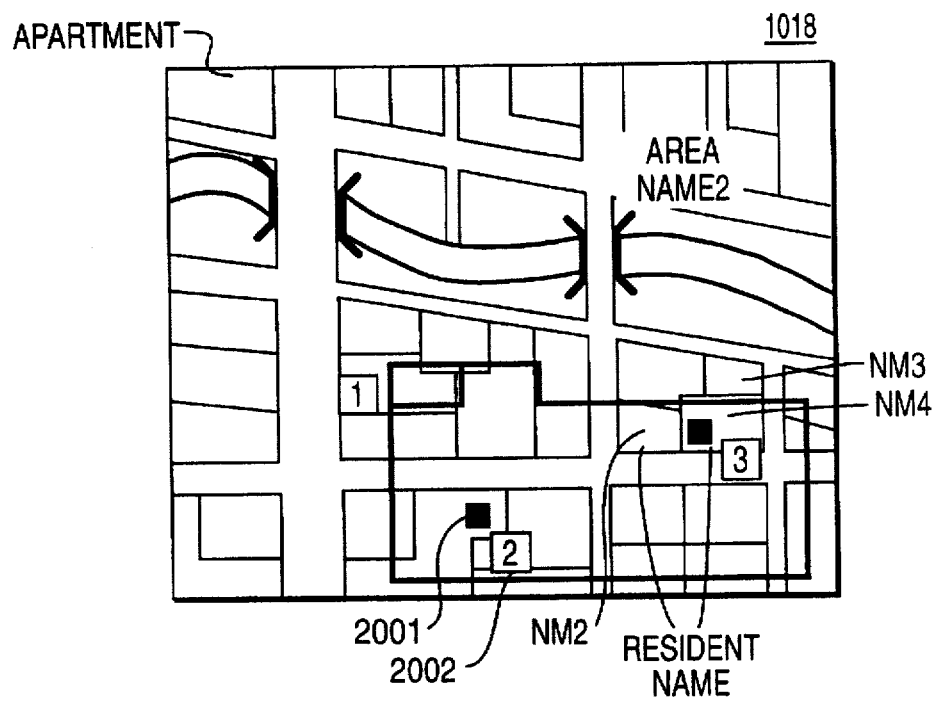
FIGS. 35A and 35B show a displayed example of the result of DB retrieval using a plurality of function sheets.

Information of the attribute information DB concerning the primary link information having a set flag in the column 705 is read referring to the columns 701 and 702 (step 90225). Referring to the display style 610b of the table 600b and the flag 626b indicating whether or not the result of DB retrieval should be displayed, data for display of the result of DB retrieval is generated from the read DB information (step 90230). The generated data is displayed on the display device 5 (step 90235). A displayed example of the result of DB retrieval is shown in FIG. 33. The results of retrieval are displayed in areas 1071b to 1074b. As is shown, values set in step 90125 are such that a full name and an address are displayed as the result of DB retrieval and the display style is a style of displaying a display area in a card form for the corresponding primary link information. A retrieval condition represented by text information of the age of seventy or older than that is displayed in an area 1034b of the function sheet. In the present embodiment, the display area of the card form and a corresponding point such as the mark 106a shown in FIG. 32B are linked in a predetermined display form. However, a display method as shown in FIG. 35A, which will be mentioned later on, can be used so that a card 2002 indicating the record number 102 or 112 of the corresponding attribute information DB takes a fixed position relative to a mark 2001 corresponding to link information. Also, in the case where the area 1041 shown in FIG. 31B is selected in step 90125, the results of retrieval of a plurality of DB's are displayed in one table.

Since the correspondence of the result of DB retrieval to a position on a map corresponding thereto is simply displayed, as mentioned above, the user can confirm the individual result of retrieval without losing sight of a correspondence to image information.

Figure 35B:
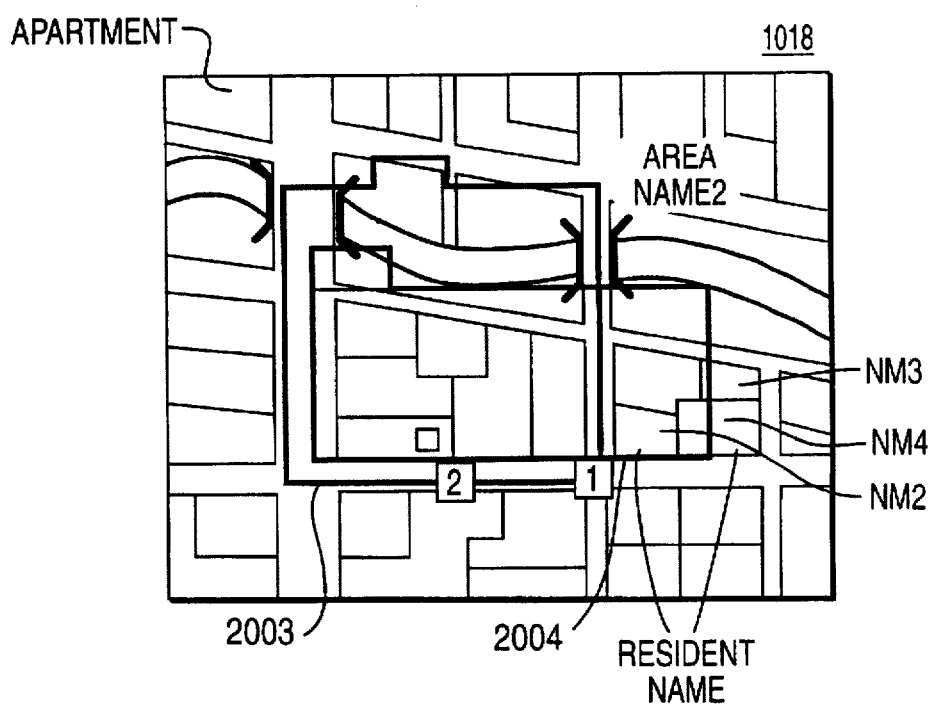

Finally, displayed examples of the result of DB retrieval using a plurality of function sheets are shown in FIGS. 35A and 35B. In FIG. 35A, two function sheets having substantially the same size are arranged overlapping. This overlapping shows that the DB retrieval is made with a plurality of retrieval conditions for one area. In FIG. 35B, function sheets having different sizes are arranged in a partially overlapping manner. In FIG. 35B is displayed the result of retrieval by a retrieval condition in which a retrieval condition possessed by a function sheet 2003 and a retrieval condition possessed by a function sheet 2004 are linked by "AND". Namely, in FIG. 35B are displayed those ones of primary link information satisfying a locational requirement of the function sheet 2003 and a locational requirement of the function sheet 2004 which satisfy a DB requirement of the function sheet 2003 and a DB requirement of the function sheet 2004. In FIG. 35A, the display is made so that a card 2002 indicating the record of the corresponding attribute information DB takes a fixed position relative to a mark 2001 corresponding to link information.

According to the present invention, when text information having a correspondence to image information is to be retrieved, there are made a quantitative retrieval which uses a retrieval key called an information lens including the partial overlaying of the original image information (or map information) with another information for retrieval and a qualitative retrieval in which the retrieval is made with the original image information (or map information) being overlaid with a retrieval key called a function sheet including the composition of a qualitative retrieval condition and an image indicative of a range of application of the retrieval condition. Thereby, the following effects are obtained. Namely, since massive text information is filtered or subjected to screening in the level of image by the quantitative retrieval, the amount of text information to be retrieved in more detail is reduced and hence a time required for retrieval is reduced. Also, Since the application range of the quantitative retrieval condition can be set by an image in the qualitative retrieval, a user can easily set the application range of the quantitative retrieval condition while taking the whole of the original image information into consideration. Further, an effective information retrieval making the best use of the above effect can be made by properly combining the quantitative retrieval and the qualitative retrieval in accordance with the result of retrieval.

According to the present invention, with a construction in which another image information is displayed in a form composed on image information displayed on a screen, it is possible to grasp the other image information in an intended area while seeing the state of the environment and to search for the intended area so that information in that area is retrieved from a DB. At this time, such image composition or generation image as will be mentioned in the following is possible.

1) The other image information including detailed information can be composed in a local area on the image information displayed on the screen. Thereby, the other detailed image information is added in only a necessary area on the original image information.

2) A magnified version of the other image information including detailed information can be composed in a local area on the displayed image information. Thereby, it is possible to easily grasp the other image information including detailed information, too.

3) The other image information including detailed information can be composed in a local area on the displayed image information and within a range in which a distance from the center is fixed. Thereby, the other image information in the fixed range around an intended point is displayed always.

According to the present invention, since a positional retrieval condition can be inputted by merely operating image information displayed on a display device, it is possible for the user to input an area to be retrieved without referring to text information representative of the position of the image information being displayed, thereby facilitating the input of the positional retrieval condition.

The preceding set value can be set as an initial value in generating a function sheet. Therefore, in the case where a part of a retrieval condition is to be changed, a condition setting time can be shortened. By providing a representative point representing an object of image information, a retrieval throughput at the time of retrieval of primary link information from an area to be retrieved is reduced, thereby shortening a retrieval time. Since the shape of a function sheet can be changed in accordance with an object of retrieval, analysis adapted for the property of an area becomes possible.

Since the format for DB retrieval is generated referring to an attribute information DB, the user can set a retrieval item even if the user does not know the contents of the attribute DB beforehand.

What is important during the setting of a retrieval condition is to represent which portion of displayed image information of an object of retrieval an area to be retrieved corresponds to. What is important after the composition of image information with a function sheet is the contents of image information in the area to be retrieved. In the present invention, therefore, it is possible to use different image information as a function sheet in accordance with either the situation which is during the setting of the retrieval condition or the situation which is after the composition with the retrieval condition.

According to the present invention, when a retrieval condition concerning an area to be retrieved is inputted, image data representing the area to be retrieved is displayed together with image data of an object of retrieval. Therefore, it becomes easy to abstract an intended object while globally grasping a map of the object of retrieval.

According to the present invention, after a retrieval process has been performed, the retrieval process can be performed again in a state in which the result of retrieval is being displayed. Therefore, the next retrieval condition can be set while referring to the preceding result of retrieval. Namely, it is possible to easily make the retrieval in a trial-and-error manner.

Since another function sheet can be generated again after a retrieval condition has been set, it becomes possible to make an analysis based on a retrieval with a retrieval condition changed for each area.

By providing a menu for start of the setting of DB requirement in image data for setting a locational requirement, the change-over of the setting of a retrieval condition is facilitated. This is effective particularly in the case where the size of the display device is large as compared with the amount of movement of a cursor per unit time.

Since it is possible to make an instruction for setting of the locational requirement even after the start of the setting of DB retrieval condition is indicated so that a retrieval condition setting window is displayed, it is possible to freely select the order of setting a positional retrieval condition and a retrieval condition for DB retrieval.

Since primary link information included in an area to be retrieved and primary link information abstracted from the earlier-mentioned primary link information in accordance with a DB retrieval condition are displayed, it is possible for the user to know to what extent the objects corresponding to a DB retrieval condition are included in objects on an image map linked with DB information. Further, the user can refer to the outline of the result of retrieval in changing a retrieval condition.

Since the correspondence of the result of DB retrieval to a position on a map corresponding thereto is displayed on the screen, the user can confirm the individual result of retrieval without losing sight of a correspondence to image information.

We claim:

1. A method for retrieving in a database through image information, comprising the steps of:

(a) reading a first image information of a database in which text information linked with the first image information is stored from a storage device (b) retrieving said text information corresponding to a specified area of a second image information linked with and displayed overlaying said first image information displayed on a display device from said database on the basis of a first user instruction from an input device and storing the retrieved text information into a work file together with said first image information corresponding to said retrieved text information; and (c) composing a retrieval condition and an area range of application thereof as an image data on the basis of a second user instruction from said input device, retrieving text information corresponding to said image data displayed overlaying said first image information displayed on said display device from said work file, and outputting the result of retrieval to said display device.

2. A method according to claim 1, further comprising the steps of:

(d) repeatedly performing said steps (a) to (c) or said step (c) c the basis of an instruction for changing image information, text information or a retrieval condition from said input device by the user.

3. A method according to claim 1, wherein said step (b) further includes the substeps of:
- (b1) displaying said first image information on said display device;
- (b2) changing display format of an image of a specified area of said second image information linked with said first image information on the basis of said first instruction from said input device and displaying the changed image in a composite form with said first image information; and
- (b3) retrieving text information corresponding to the changed image from said database stored in said storage device in a form linked with said first image information.

4. A method according to claim 1, wherein said step (c) includes the substeps of:
- (c1) composing image data with a retrieval condition represented by text format and an image representing an area range of application of said retrieval condition on the basis of an instruction from said input device by the user;
- (c2) displaying said image data overlaying said first image information on said display device; and
- (c3) retrieving text information corresponding to said retrieval condition composed in said image data from said database stored in said storage device in a form linked with said first image information.

5. A method for retrieving in a database through image information, comprising the steps of:
- (a) reading a first image information of a database in which text information linked with the first image information is stored from a storage device;
- (b) displaying said first image information on a display device;
- (c) changing display format of an image of a specified area of second image information linked with said first image Information on the basis of an instruction from an input device and displaying the changed image in a composite form with said first image information; and
- (d) retrieving text information corresponding to the changed image from said database stored in said storage device in a form linked with said first image information.

6. A method according to claim 5, further comprising the steps of:
- (e) repeatedly performing said steps (a) to (d) on the basis of a user instruction for changing image information, text information or retrieval condition from said input device.

7. A method for retrieving in a database through image information, comprising the steps of:
- (a) composing image data with a retrieval condition represented by text format and an image representing an area range of application of said retrieval condition on the basis of an instruction from said input device by the user;
- (b) displaying said image data overlaying said image information on said display device; and retrieving text information corresponding to said retrieval condition composed in said image data from said database stored in said storage device in a form linked with said image information.

8. A method according to claim 7, further comprising the steps of:
- (d) repeatedly performing said steps (a) to (c) on the basis of a user instruction for changing image information, text information or retrieval condition from said input device.

9. A method according to claim 3, wherein in said substep (b2), a magnified version of said specified area of said second image information including another kind of information is composed in a local area on said first image information, said local area corresponds to said specified area of said second image information.

10. A method according to claim 3, wherein in said substep (b2), said specified area of said second image information including another kind of information is composed in a local area on said first image information and within area range in which a distance from a center position set by the user is predetermined.

11. A method according to claim 3, wherein in said substep (b2), a modified version of a part of said second image information including another kind of information is composed in a local area on said first image information by use of the correspondence of said first image information to said second image information to be composed thereon.

12. A method according to claim 1, wherein in said step (c), a plurality of image data each of which is composed with different retrieval condition and area range of application thereof are displayed overlaying said image information displayed on said display device on the basis of an instruction from said input device by the user, text information corresponding to the result of a logical operation defined by said different retrieval conditions and area ranges included in said plurality of image data is retrieved from said work file, and the result of retrieval is outputted to said display device.

* * * * *